Figure 1:
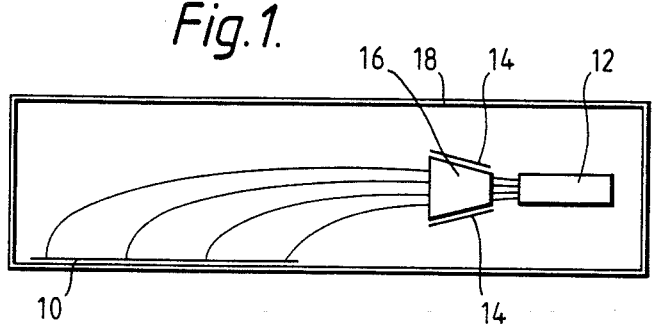

United States Patent [19]

Mallinson et al.

[11] Patent Number: 4,583,118

[45] Date of Patent: Apr. 15, 1986

[54] CIRCUITS FOR CONVERTING FROM ONE TELEVISION SCANNING STANDARD TO ANOTHER

[75] Inventors: Andrew M. Mallinson, Salem, N.H.; Adrian H. W. Hoodless, Radwell, England

[73] Assignee: Ferranti, PLC, Cheshire, England

[21] Appl. No.: 650,643

[22] Filed: Sep. 14, 1984

[30] Foreign Application Priority Data

Sep. 15, 1983 [GB] United Kingdom ................. 8324713

[51] Int. Cl.$^4$ .............................................. H04N 3/27
[52] U.S. Cl. .................................... 358/148; 315/366; 315/367; 358/242; 364/521
[58] Field of Search ............... 358/140, 242, 152, 148, 358/17; 315/366, 367; 364/521, 522

[56] References Cited

U.S. PATENT DOCUMENTS 4,148,074  4/1979  Stakhou ............................... 358/242
4,402,011  8/1983  Newton ................................ 358/148
4,439,839  9/1982  McGinn .............................. 358/148

Primary Examiner—Howard W. Britton
Attorney, Agent, or Firm—Dennis P. Clarke

[57] ABSTRACT

A circuit for converting a TV receiver to operate in accordance with the system associated with received signals, there being either F or F' scan lines in a field, with $F<F'$, includes a counter driven by pulses each representative of one end of a raster scan line, and having M stages, with F and $F'<M<2F$ and $2F'$. There is also means to preload the counter selectively with a count of R or R', where $(M-2R)=F$ and $(M-2R')=F'$. Wide window means detects when a field sync pulse is within a window including the (M−R)th and (M−R') stages, and, in response, the counter, initially, is preloaded with R'. Decision logic means then detects whether a field sync pulse occurs after the Kth stage, with $K=M-[R+R']/2$, when R' is continued to be preload; or occurs before the Kth stage, when R subsequently is preloaded; and the required TV receiver conversion is completed.

12 Claims, 10 Drawing Figures

CIRCUITS FOR CONVERTING FROM ONE TELEVISION SCANNING STANDARD TO ANOTHER

This invention relates to circuits for converting television (TV) receivers, capable of operating in accordance with, at least, two transmission systems, to operate in accordance with the appropriate system, in response to the receipt of signals of one system, and in particular, although not exclusively, to such TV receivers each employing a so-called flat screen cathode ray tube (CRT), having an electron beam gun assembly extending parallel to the plane of a rectangular shaped CRT screen, in a plane only displaced by a small distance from the screen plane, the electron beam gun assembly when viewed together with the screen, with the CRT screen being viewed in plan, being displaced laterally from the CRT screen, and any required display is provided on the rectangular shaped CRT screen by the electron beam scanning over the screen with a conventional raster scan pattern.

In general, the present invention relates to any form of TV receiver in which means is required to be provided to correct for any form of distortion, otherwise obtained, for the raster scan pattern. However, only a flat screen TV receiver is referred to in this specification.

For a TV receiver not having the flat screen construction it is conventional to provide the required raster scan pattern by applying deflection signals in the form of linear-portion saw-tooth waveforms to the deflection plates, the desired saw-tooth waveforms being generated, possibly, solely by analogue means.

Inherently with the particular construction of a flat screen TV receiver referred to above, if such linear-portion saw-tooth waveforms are applied to the deflection plates, a distorted raster scan pattern, having a truncated fluted shape, is provided in relation to the flat screen CRT. For example, with the electron gun assembly extending parallel to an extension of the longitudinal axis of symmetry of the screen, the longitudinal axis of symmetry of the flute shaped raster pattern is coincident with the longitudinal axis of symmetry of the CRT screen.

It is known to correct for such truncated, flute shaped distortion of the raster scan pattern for a flat screen TV receiver by applying to the deflection plates appropriately non-linear portion saw-tooth waveforms generated solely by analogue means, and so that the provided raster scan pattern is coincident with, at least substantially, without distortion, having the same size, and shape as, the rectangular shaped CRT screen.

In particular, although not exclusively, the present invention relates to a TV receiver in which distortion of the raster scan pattern, otherwise produced, is compensated for by employing digital means to drive digital to analogue converters (DAC's), the DAC's being arranged to generate functions to shape the waveforms of the deflection signals to be applied to the X and Y deflection plates of the CRT, in the way required to compensate for the raster pattern distortion, the analogue output of one DAC, to cause each raster line scan, being applied to the X deflection plates, possibly via integrating means, and the analogue output of another DAC being applied to the Y deflection plates, the digital means being arranged to provide digital output signals, possibly of differential form to the DAC's, and, in response, the DAC's each providing an analogue output, also possibly of differential form.

It is an object of the present invention to provide a circuit for such a TV receiver, and in particular, although not exclusively, a flat screen TV receiver, in which circuit there is provided means whereby, in response to the TV receiver detecting broadcast field synchronism (sync) pulses, of, say, two transmission systems it is capable of receiving, and determining whether they relate to, for example, either the 525, or the 625, display frame line transmission system, the TV receiver is arranged to provide automatically the required raster scan pattern for the appropriate transmission system.

According to the present invention a circuit for converting a TV receiver, capable of operating in accordance with, at least, two transmission systems, to operate in accordance with the appropriate system, in response to the receipt of signals of one system, the circuit having a counter, or the equivalent thereof, driven by pulses supplied thereto at a constant pulse repetition rate, each pulse representative of one end of a raster scan line, the counter being considered as having M (e.g. 512) constituent stages, where M is greater than, but preferably not twice as great as, either constituent number of raster field line scans, F and F', with F less than F', (e.g. 262/263 or 312/313 raster lines), in each of the two interlaced raster field patterns comprising each frame, of two possible forms of frame (e.g. 525 or 625 line frames), to be displayed by the TV receiver, and associated with the two transmission systems, a field synchronism (sync) pulse being capable of being considered as being provided at the end of each transmitted information field, inherently the arrangement being such that the centre raster line of each raster field pattern, of either of the two possible forms of raster frame pattern to be provided by the TV receiver, corresponding to the digital signal from the centre, M/2th, stage of the counter, and it being convenient to consider that relative timings in maximum possible operating cycle periods of the counter are represented by each of the constituent counter stages considered as providing individually, and instantaneously, a digital signal, and the circuit including logic means capable of preloading, selectively, one of two possible counts R and R' (e.g. 125 and 100) into the counter, before operating cycles of the counter, the arrangement being such that (M−2R) is equal to F, and (M−2R') is equal to F', the logic means including a first constituent part, (designated wide window logic), arranged to detect when a field sync pulse occurs within a first time interval of a counter operating cycle period, the first time interval comprising a minor portion of the maximum possible operating cycle period of the counter, and starting at the relative timing corresponding to the Gth counter stage (e.g. at the 315th counter stage), before the relative timing in the operating cycle period corresponding to the (M−R)th counter stage, and terminating at the relative timing corresponding to the Hth counter stage (e.g. at the 420th counter stage), after the relative timing corresponding to (M−R')th counter stage, and the logic means also including a second constituent part, (designated 525/625 decision logic), arranged to detect when a field sync pulse occurs in relation to the relative timing corresponding to the Kth counter stage (e.g. at the 400th counter stage), the relative timing corresponding to the Kth stage being between the relative timings corresponding to the (M−R)th and (M−R')th counter stages, with K usually equal to M−[R+R']/2, in operation, each counter operating cycle terminating at the Hth counter stage, until the first constituent part of the logic means detects a field sync pulse within the first time interval of a counter operating cycle period, and, in response, a count of R' being preloaded into the counter before its next operating cycle, and the first constituent part of the logic means also enabling the second constituent part of the logic means, when a subsequent (e.g. the next) field sync pulse is detected by the first constituent part of the logic means to be within the first time interval of the associated counter operating cycle period, and when the second constituent part of the logic means determines that the next field sync pulse is after the relative timing corresponding to the Kth counter stage, the logic means being arranged to continue to preload a count of R' into the counter before subsequent operating cycles of the counter, and when the second constituent part of the logic means determines that the next field sync pulse is before the relative timing corresponding to the Kth counter stage, the logic means being arranged to preload a count of R into the counter before subsequent operating cycles of the counter, whereby the required conversion of the TV receiver is completed, and each counter operating cycle now terminating at the (M−R)th, or the (M−R')th, stage, where appropriate.

Figure 2:
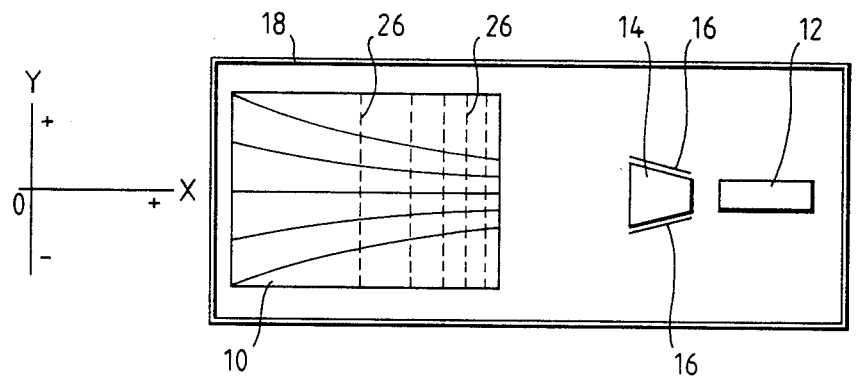
Figure 3:
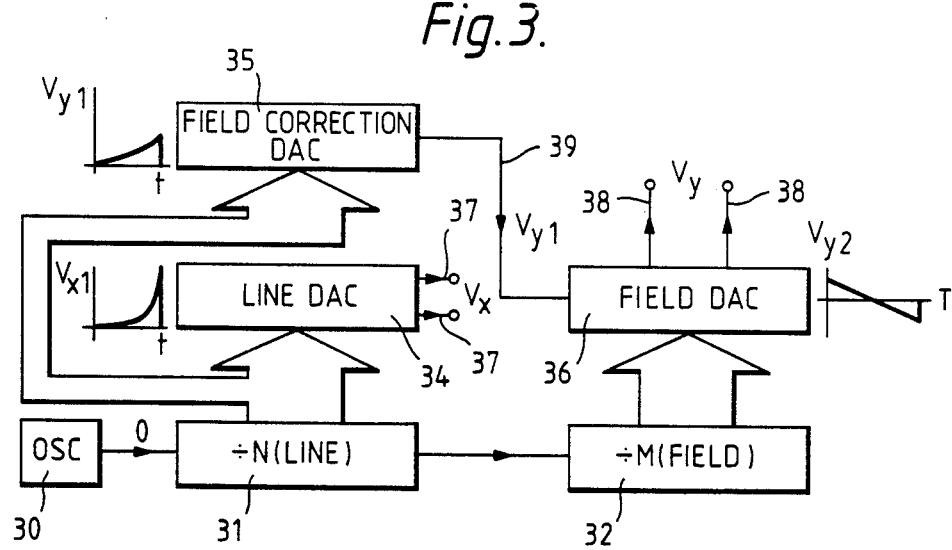

The present invention will now be described by way of example with reference to the accompanying drawings, in which:

FIG. 1 is a side elevation of the cathode ray tube (CRT) of a flat screen TV receiver, the side of the CRT envelope being omitted to show the screen, the electron gun assembly and the deflection plates of the CRT, there also being indicated electron beam paths impinging at spaced points along a raster line scan, of the raster scan pattern, provided by the TV receiver, FIG. 2 corresponds to FIG. 1, but is a plan view of the CRT, the front of the CRT envelope being omitted, to show the screen, the electron gun assembly and the deflection plates of the CRT, there also being indicated a distorted, truncated, flute shaped raster scan pattern provided on the CRT screen if linear-portion saw-tooth waveforms are applied to the deflection plates of the flat screen TV receiver, as would be so applied in a conventional TV receiver, FIG. 3 is a block diagram of an arrangement of digital means arranged to drive digital to analogue converters (DAC's), to generate the deflection signals to be applied to the deflection plates of the CRT of one embodiment of a flat screen TV receiver, to provide a raster scan pattern coincident with the CRT screen, and the raster scan pattern being at least substantially, free from the truncated, flute shaped distortion illustrated in FIG. 2.

Figure 4:
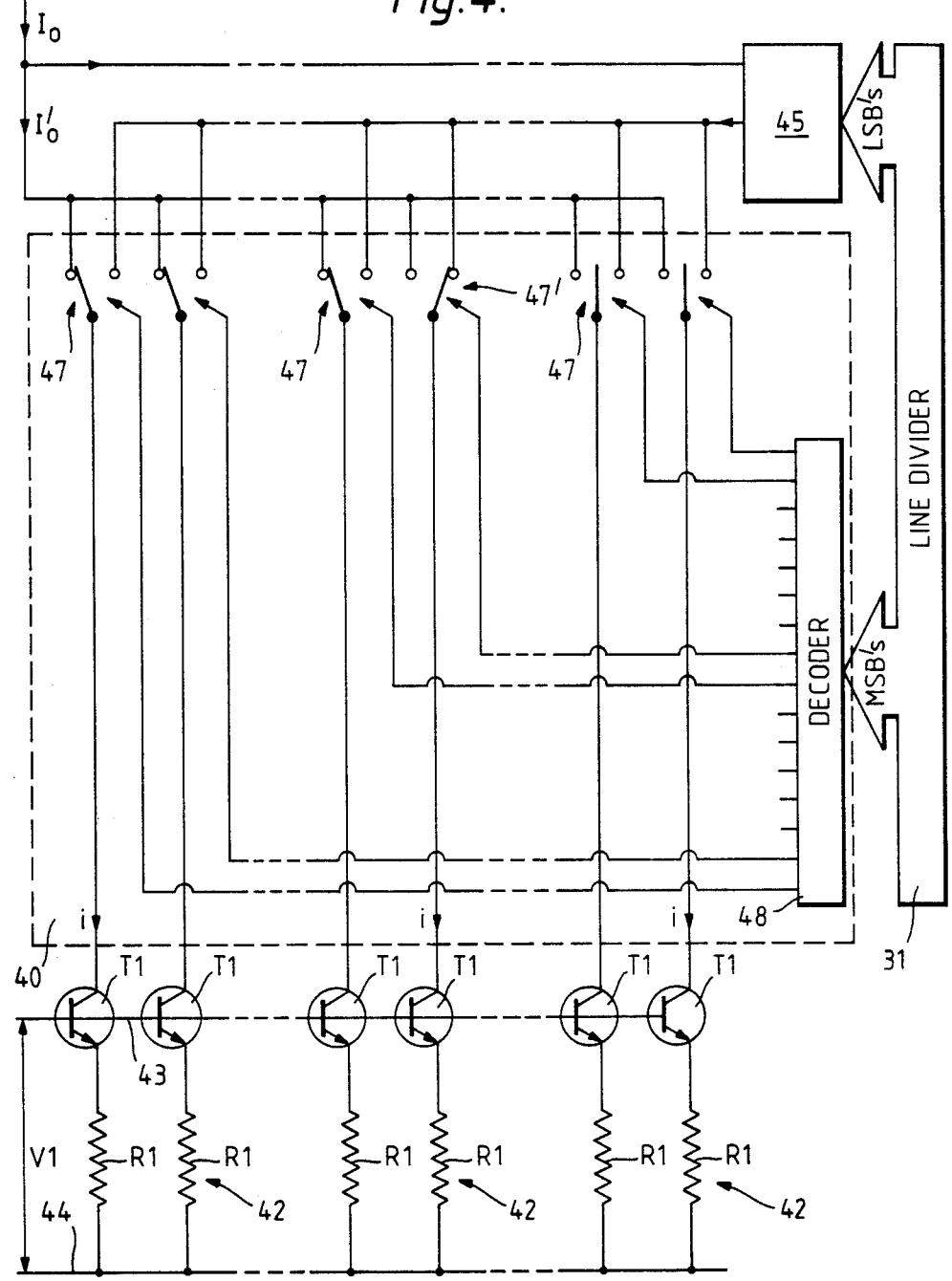
Figure 5:
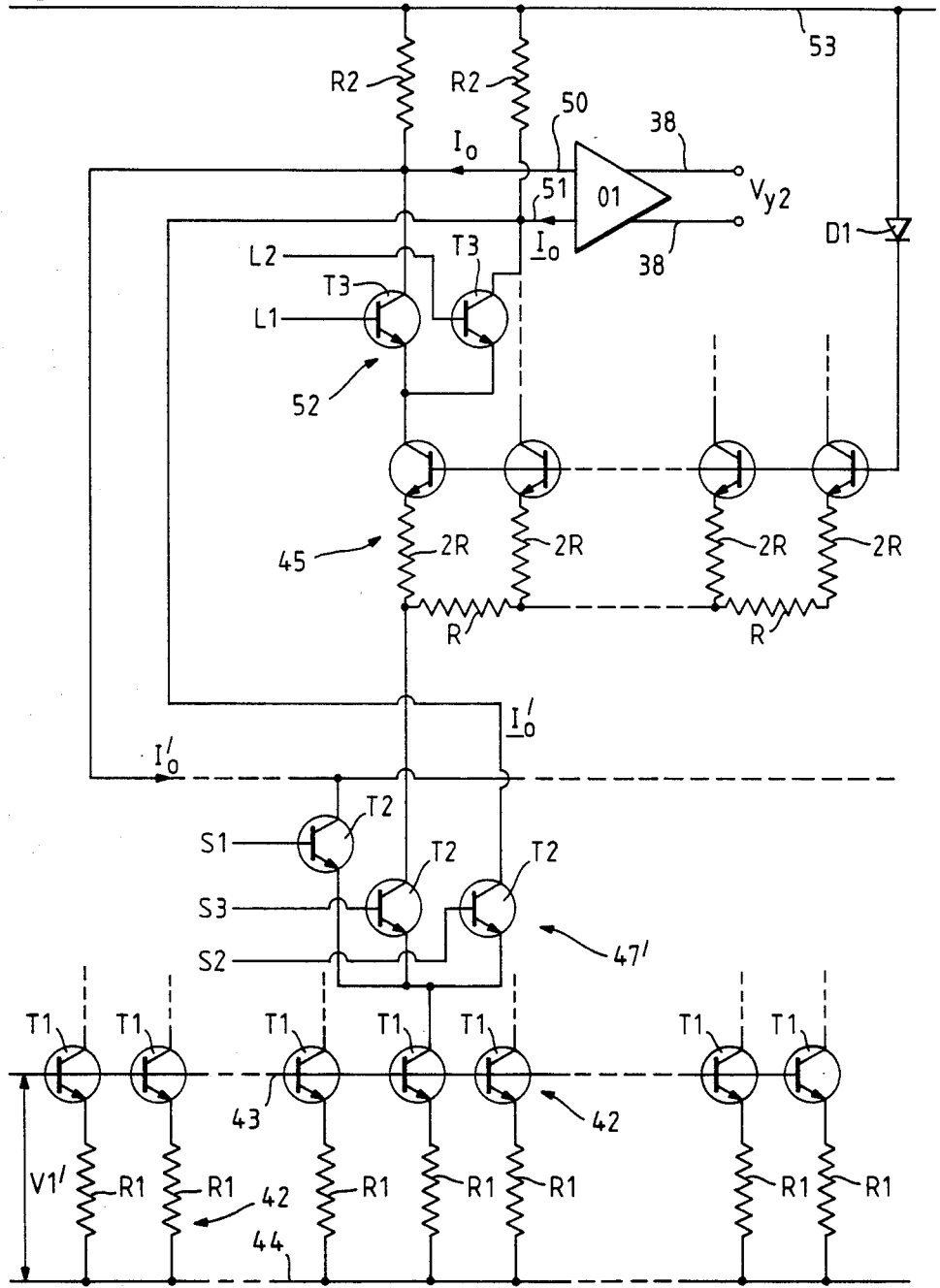
Figure 6:
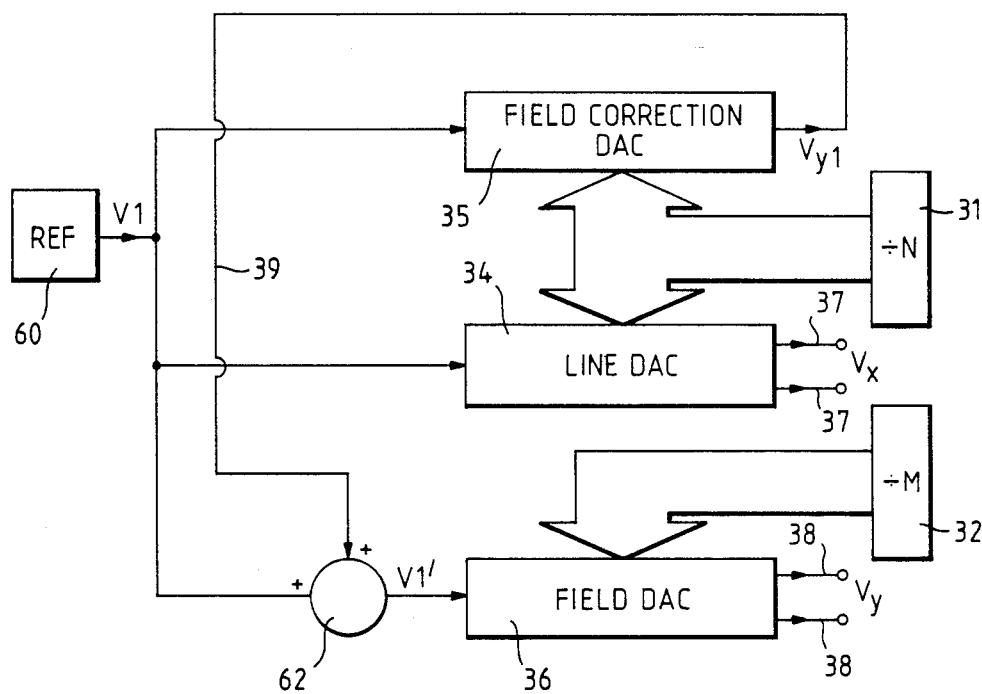
Figure 7:
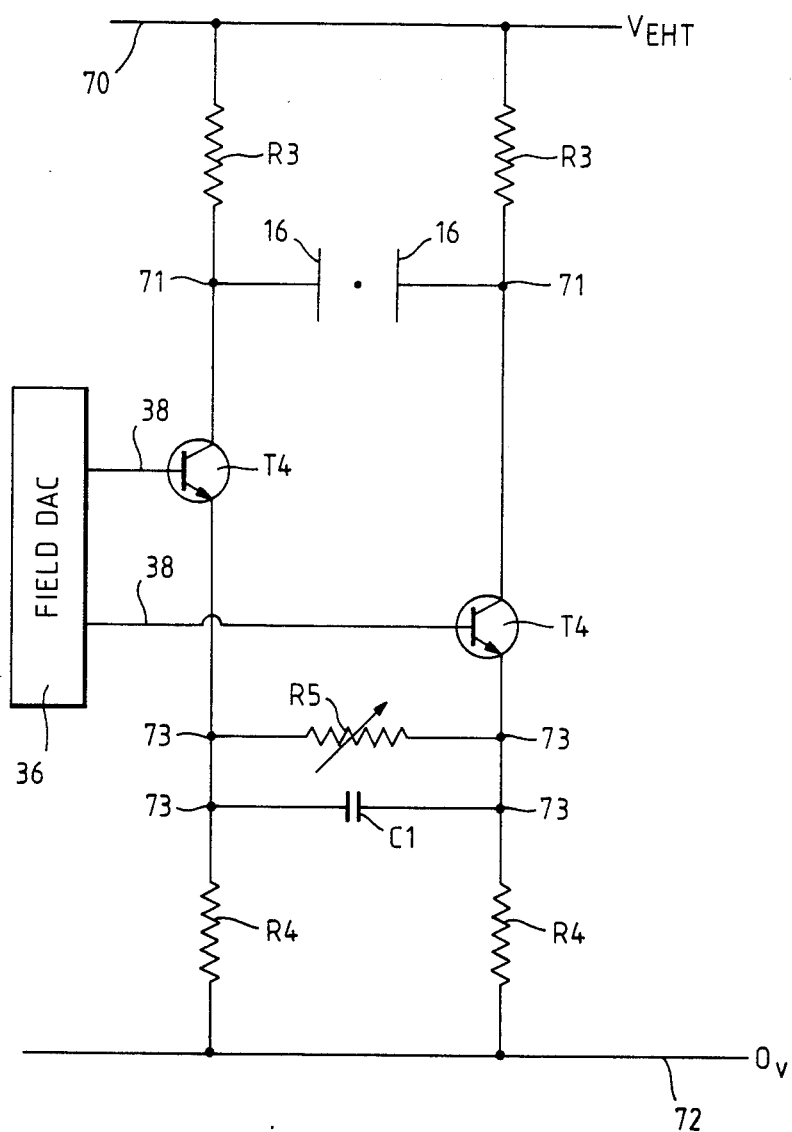
Figure 8:
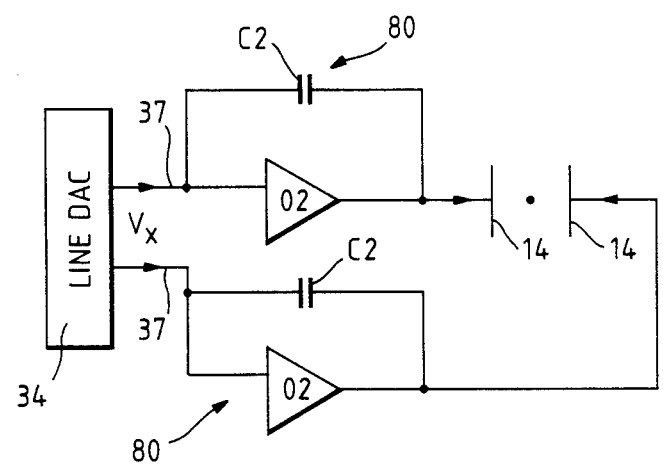
Figure 9:
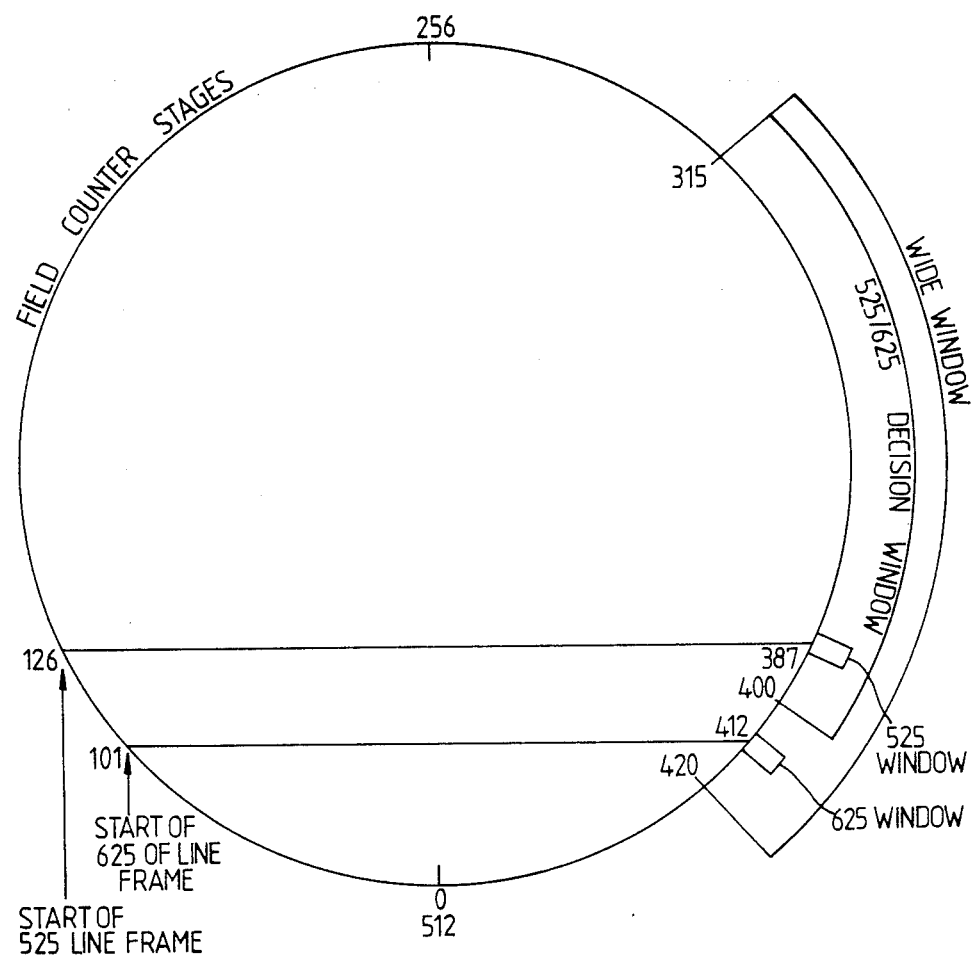
Figure 10:
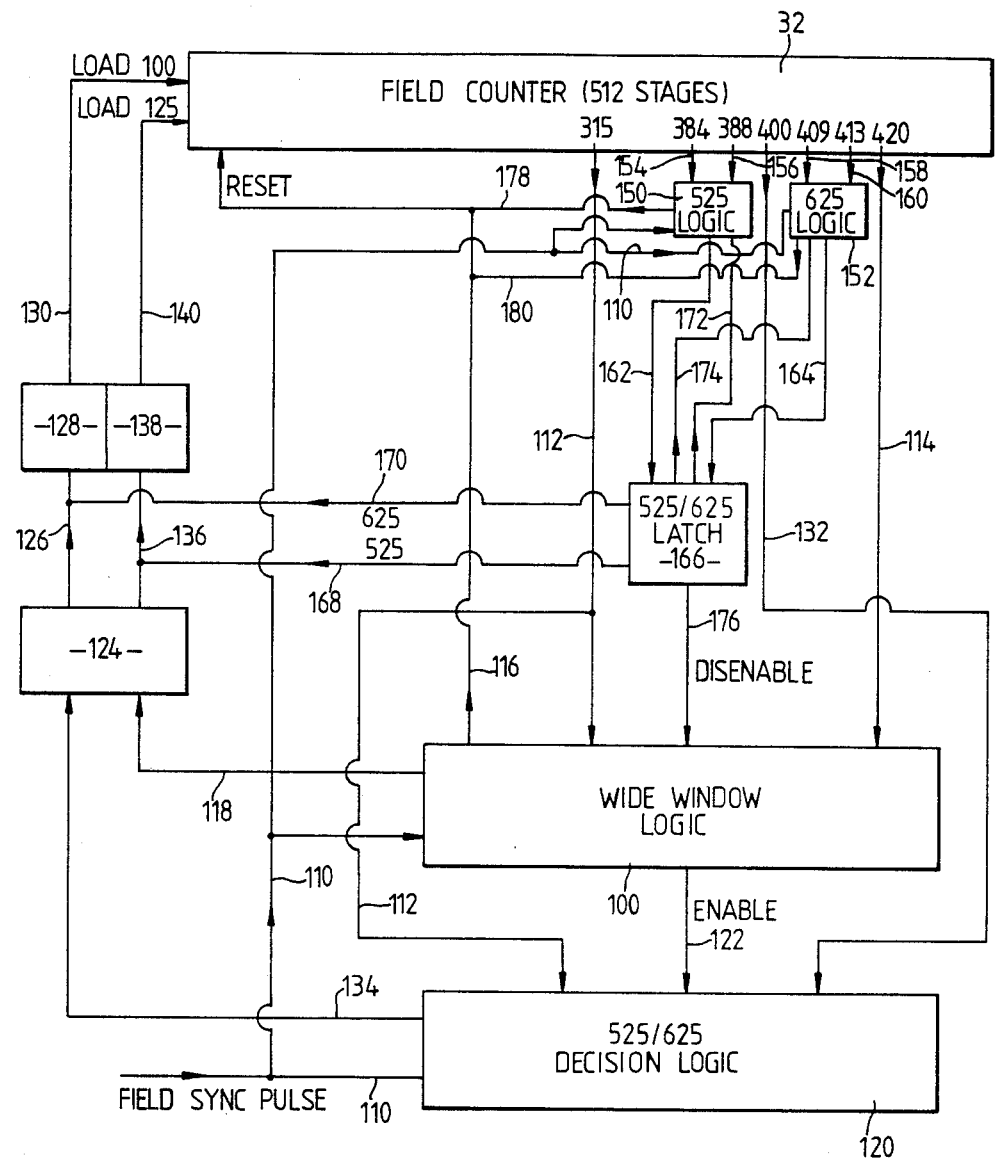

FIG. 4 shows, in schematic form, a so-called segmented DAC, arranged to operate upon digital input signals which are not differential in form, in contrast to each DAC of the arrangement of FIG. 3 being required to operate upon digital input signals which are differential in form, FIG. 5 corresponds to FIG. 4, but shows a modified form of the DAC capable of operating upon differential digital input signals, and, in response, to provide a stepped analogue output, also of differential form, FIG. 6 corresponds to FIG. 3, but is of the arrangement redrawn to illustrate the supply of reference voltages to current sources of the segmented DAC's, FIG. 7 is of the circuit whereby the differential analogue output from the appropriate DAC is applied to the Y deflection plates of the CRT, FIG. 8 is a block schematic diagram showing how the differential analogue output of one, Line, DAC, of the arrangement of FIG. 3, is applied to integration means before the outputs of the integration means are applied to the X deflection plates of the CRT, FIG. 9 is a representation, in relation to the 512 constituent stages considered to be included in a nine-bit Field counter of the digital means, the representation being of the manner of operation of logic means, in accordance with one embodiment of the present invention, whereby, in response to the TV receiver detecting broadcast field synchronism (sync) pulses, and determining whether they relate to the 525, or the 625, display frame line transmission system, the TV receiver is arranged to provide automatically the required raster field scan pattern for the appropriate transmission system, and, respectively, having 262/263 or 312/313 constituent raster scan lines, and FIG. 10 is a schematic diagram of the logic means referred to above in relation to the representation of FIG. 9.

The present invention relates to a TV receiver, for convenience also referred to herein as a cathode ray tube (CRT) display system, the display being provided on a rectangular shaped CRT screen by the electron beam scanning over the screen with a conventional raster scan pattern. For example, the CRT provided may be of the flat screen type of construction, in which case it is required that the provided raster scan pattern is coincident with, at least substantially, without distortion, having the same size, and shape, as the rectangular shaped CRT screen. Usually, the CRT is provided with electrostatic deflection plates. Such a CRT is described in British patent specification No. 1592571.

It is convenient to consider that, when the rectangular shaped CRT screen is viewed in plan, the X axis of the screen extends coincident with the longitudinal axis of symmetry of the screen, and the Y axis extends along the shorter axis of symmetry of the screen. Thus, when the appropriate potential differences, in the form of deflection signals, are applied across, what are considered to be, the X deflection plates of the flat screen CRT the electron beam is caused to scan along raster lines parallel to the X axis of the screen, and when the appropriate potential differences, or deflection signals, are supplied across, what are considered to be, the Y deflection plates there are caused the successive raster scan lines in a raster scan frame, the raster scan lines being spaced from each other along the Y axis of the screen, and at right angles thereto, in a known manner.

There is shown in FIG. 1 the side elevation of a flat screen CRT, the side of the CRT envelope being omitted to show the CRT screen 10, an associated electron gun assembly indicated generally at 12, and deflection plates 14 and 16, of a flat screen CRT display system to which the present invention relates. These components are shown in an envelope 18. Also shown in FIG. 1 are typical electron beam paths, from the electron gun assembly 12, between the X deflection plates 14, to impinge on the screen 10, at uniformly spaced points along a raster scan line. The potential differences between the X deflection plates 14 control the displacement of the electron beam parallel to the X axis of the screen. The electron gun assembly 12 extends parallel to the screen plane, in a plane only displaced by a small distance from the screen plane. The Y deflection plates are indicated at 16, and the potential differences therebetween control the displacement of the electron beam parallel to the Y axis of the screen.

FIG. 2 corresponds to FIG. 1, but is a plan view of the CRT, the front of the CRT envelope 18 being omitted to show the CRT screen 10 in plan. As can be seen in FIG. 2, the electron gun assembly 12, when so viewed, extends coincident with an extension of the X axis, indicated at the left hand side (LHS) of the Figure, or the longitudinal axis of symmetry, of the CRT screen 10, the electron gun assembly being displaced laterally from the screen.

For a CRT display system not having a flat CRT screen construction, for example, as shown in FIGS. 1 and 2, it is conventional to provide the required raster scan pattern by applying deflection signals comprising linear-portion saw-tooth waveforms to the deflection plates, the desired saw-tooth waveforms being generated, possibly, solely by analogue means. Inherently with the construction of a flat screen CRT display system, as shown in FIGS. 1 and 2, if such linear-portion saw-tooth waveforms are applied to the deflection plates 14 and 16, a distorted raster scan pattern, having a truncated fluted shape, is provided in relation to the CRT screen, the longitudinal axis of symmetry of the flute shaped raster pattern being coincident with the X axis, or the longitudinal axis of symmetry, of the screen, as is desired. Such a truncated flute shaped raster scan pattern is shown in FIG. 2 superimposed upon the screen 10 of the illustrated flat screen CRT.

In respect of a flat CRT screen display system to which the present invention relates, the required deflection signals to be supplied to the deflection plates 14 and 16, in order to cause the electron beam to scan in the required raster scan pattern, coincident with, at least substantially, free from distortion, having the same size, and shape, as the rectangular shaped CRT screen, are generated by digital means including counters, and arranged to drive digital to analogue converters (DAC's).

In particular, it is convenient, as described below, if the digital means, and the DAC's to generate the required deflection signals to be supplied to the deflection plates 14 and 16, are arranged to operate upon digital differential signals. Each such digital differential signal has two constituent parts, on two leads, each constituent part comprising, individually, a voltage signal. Thus, there is a said one voltage signal of one sense, at one of two possible logic levels, and a said other voltage signal, at the other of the two possible logic levels, in relation to what is considered to be the associated logic threshold mid-way therebetween. Said other voltage signal is considered to be complementary to said one voltage signal, although the associated pair of signals may not be at the same potential, but of opposite sense. Said other voltage signal may be of the same sense as, but of a lower potential than, said one voltage signal, in relation to zero potential; or vice versa. The corresponding differential signal comprises the difference between the potentials of the associated pair of voltage signals. The logic threshold associated with the digital differential signal, if not zero potential, is considered to be the common mode voltage associated with the differential signal.

For each digital differential signal a logic "0" is provided by one constituent voltage signal of the differential signal being negative, and the other constituent voltage signal being positive, or said one voltage signal being more negative than said other constituent voltage signal, and a logic "1" is provided by said one voltage signal being positive, or more positive than said other voltage signal; or vice versa.

For convenience, hereinafter in this specification, and the accompanying claims, digital differential inputs and outputs of constituent portions of the flat screen CRT display system to which the present invention relates are referred to, each such digital differential input, or output, being considered as providing a series of discrete differential signals to be operated upon in the required manner within the display system. In relation to each such differential input there is a pulse repetition rate associated with possible changes in the logic levels, a constituent differential input signal, of the series of differential input signals, being considered as being provided, corresponding to each consecutive pulse from a clock pulse generator, or oscillator, at the pulse repetition rate associated therewith, the oscillator being included in the display system to control the operation of the associated portion of the system. In relation to each differential output from a constituent portion of the display system, there is considered to be provided a series of differential output signals, each such differential output signal being provided in response to a simultaneous differential input signal, or signals, to the portion, and operated upon therein. There are logic levels associated with digital differential outputs, and the differential output logic levels may not be the same as the differential input logic levels.

Similarly, it is known to provide differential digital signals to drive DAC's, and it is known that the stepped, analogue outputs from the DAC's, for example, driven by the digital means referred to above, are of such a differential form, although not having any logic levels associated therewith. The centre potential of each constituent analogue signal, or step, considered to be discrete, within such a stepped differential analogue output, and corresponding to a simultaneous discrete, differential, digital input signal, or signals, to the associated DAC, is considered to be the common mode potential of the differential analogue output signal. The magnitude associated with a differential analogue output signal is represented by the potential difference between the constituent parts of the differential analogue output signal.

The general scheme of such digital means, DAC's to cause the generation of the required raster scan pattern, is shown in FIG. 3.

An oscillator 30, of a known construction, provides pulses, at a constant pulse repetition rate 0 to a divide by N counter 31, which in turn provides pulses, at a rate 0/N, to a divide by M counter 32. Each counter 31 or 32 comprises a ripple-through shift register, arranged to operate upon differential pulses, or signals, supplied thereto from the oscillator 30. Conveniently, it can be considered that in the required raster scan pattern each raster scan line has N pixel points, and that there are M raster scan lines in the pattern. Hence, if the desired display refresh rate is once per second, the required oscillator pulse repetition rate 0 is N.M. Hertz. If the desired display refresh rate is a multiple D per second, the pulse repetition 0 of the oscillator is D.M.N. Hertz, and the counter 32 receives pulses at the rate D.M. Hertz.

For each counter 31 and 32, when considered from the start of their operations, and in response to the receipt of each oscillator pulse, a corresponding multi-bit digital signal is provided in parallel form from the counter, a different digital signal being provided in response to the receipt by the counter of the different pulses. When the counter 31 has received N pulses from the oscillator 30, or when the counter 32 has received M pulses from the counter 31, the counter resets, and in the case of the counter 31, provides a pulse to the counter 32. Thus, there is an operating cycle associated with each counter 31 or 32, the period of each repetitive operating cycle for the counter 31 being at least equal to a required raster line scan period (t), and the period of each repetitive operating cycle for the counter 32 being at least equal to a required raster frame scan period (T). Further, successive oscillator pulses received by the counter 31 correspond to successive pixels in the raster scan lines, so that in each repetitive operating cycle of the counter, the successive N differential digital signals therefrom, as N oscillator pulses are supplied successively to the counter, represent the successive pixels on a raster scan line, and, in particular are capable of representing the successive pixel positions in the raster scan line. Similarly, for an undistorted raster scan pattern, successive pulses received by the counter 32 correspond to successive raster lines in the raster frames, so that in each repetitive operating cycle of the counter, the successive M differential digital signals therefrom, as M pulses are supplied successively to the counter, represent the successive raster scan lines in a raster frame, and, in particular, are capable of representing the successive raster line positions in the raster frame.

Each series of differential digital signals from the counter 31, in an operating cycle of the counter, is supplied to a DAC 34 arranged to provide, in response, an appropriately stepped, differential, analogue current output, to cause the provision of corresponding deflection signals to be supplied to the X deflection plates 14 in a raster line scan period (t), to cause the straight raster line scan, of an undistorted raster scan pattern, to be produced. As stated above, successive differential digital DAC input signals represent successive pixel positions along the raster scan line, the pixel positions being required to be uniformly spaced along the raster line, and hence parallel to the X axis, or the longitudinal axis of symmetry of the CRT screen 10. Similarly, each series of differential digital signals from the counter 32, in an operating cycle of the counter, is supplied to a DAC 36 arranged to provide, in response, an appropriately stepped, differential, analogue current output, to cause the provision of corresponding deflection signals to be supplied to the Y deflection plates 16 in a raster frame scan period (T), for an undistorted raster scan pattern. As stated above, successive differential digital DAC input signals represent successive straight raster scan line positions within the raster frame, the raster line positions being required to be uniformly spaced along the Y axis, or the shorter axis of symmetry of the CRT screen 10.

It is convenient to refer to the counter 31 as the Line counter, associated with the X axis of the required raster scan pattern, and to refer to the counter 32 as the Field counter, associated with the Y axis of the required raster scan pattern.

If there are to be between 64 and 128 pixel positions in each raster scan line, the binary number N, associated with the Line counter 31 is required to be 128, the Line counter 31 provided being a seven-bit counter. Similarly, if there are to be between 256 and 512 raster scan lines in each raster scan frame, the binary number M, associated with the Field counter 32 is required to be 512, the Field counter 32 provided being a nine-bit counter.

In response to each pulse from the oscillator 30, a corresponding, parallel, seven-bit digital signal, of differential form, is provided from the Line counter 31, both to the DAC 34, designated the Line DAC, and to a DAC 35, designated the Field Correction DAC. Each differential digital signal from the Line counter 31 is representative of the number of pulses instantaneously stored in the Line counter. Similarly, in response to each pulse received by the Field counter 32, a corresponding, parallel, nine-bit digital signal, of differential form, is provided from the Field counter 32 to the DAC 36, designated the Field DAC, and each such differential digital signal is representative of the number of pulses instantaneously stored in the Field counter 32.

The corresponding, differential, appropriately stepped analogue current output from the Line DAC 34 is shown as being provided on two leads 37, and is to cause the corresponding appropriate voltage deflection signals, to be applied to the X deflection plates 14, the leads 37 being connected individually to the X deflection plates 14. Similarly, the corresponding, differential, appropriately stepped analogue current output from the Field DAC 36 is shown as being provided on two leads 38, to cause the corresponding appropriate voltage deflection signals, to be applied to the Y deflection plates 16, the leads 38 being connected individually to the Y deflection plates 16.

For convenience, and as indicated at the LHS of FIG. 2, the centre of the LHS of the CRT screen 10 is considered to be the origin of both the X and Y axes associated with the screen, the positive and negative portions of the axes extending in their usual directions.

When the electron beam is required to impinge on the centre raster line of the raster scan pattern, coincident with the X axis, and with the associated Y axis value being zero, the common mode voltage of the differential analogue signal applied to the Y deflection plates 16 is required to have an appropriate high positive value. The difference between the potentials of the Y deflection plates 16 is zero. Differences between the potentials of the Y deflection plates 16 cause corresponding deflections of the impingement point of the electron beam on the CRT screen parallel to the Y axis. The electron beam being negatively charged, requires the potential differences associated with the differential analogue signals to be applied to the Y deflection plates 16 to be such that the upper Y deflection plates, as shown in FIG. 2, is at a greater positive potential than the positive potential of the lower Y deflection plate, for the electron beam to impinge upon a raster line in the upper part of the CRT screen 10, with the associated Y axis value being positive. Consequently, because the upper part of the CRT screen 10 corresponds to the positive going part of the Y axis, such a potential difference is referred to as being positive, and the corresponding differential analogue signal to be applied to the Y deflection plates is referred to as being positive. Similarly, when the electron beam is required to impinge upon a raster line in the lower part of the CRT screen 10, with the associated Y axis value being negative, the upper deflection plate is required to be at a smaller positive potential than the positive potential of the lower Y deflection plate. The corresponding potential difference is referred to as being negative, and the corresponding differential analogue signal to be applied to the Y deflection plates is referred to as being negative.

However, when the electron beam is required to impinge on the Y axis of the CRT screen, with the associated X axis value being zero, as is apparent from FIG. 1, the corresponding common mode potential of the differential, analogue signal applied to the X deflection plates 14 is required to have an appropriate high positive value, but the potential of the lower X deflection plate, as shown in FIG. 1, is more positive than the potential of the upper X deflection plate. For convenience, this potential difference is considered to be zero, corresponding to the X axis value being zero. Further, for the electron beam to impinge upon the CRT screen 10, with the associated X axis value being positive, the potential of the lower X deflection plate is required to be even more positive, in relation to the potential of the upper X deflection plate, than when the electron beam impinges on the Y axis, and, in this case, the potential difference is referred to as being positive, and the corresponding differential analogue signal to be applied to the X deflection plates is referred to as being positive. Similarly, if the potential of the lower X deflection plate is required to be less positive, in relation to the potential of the upper X deflection plate, than when the electron beam impinges on the Y axis, and, in this case, the potential difference is referred to as being negative, and the corresponding differential analogue signal to be applied to the X deflection plates is referred to as being negative.

Ignoring, initially, the Field Correction DAC 35, and assuming, initially, that both the Line DAC 34 and the Field DAC 36 operate in accordance with appropriate linear functions, if the differential, linearly varying analogue output from the Line DAC causes corresponding deflection signals to be applied to the X deflection plates of a conventional CRT display system, not having a flat CRT screen type of construction, and the differential, linearly varying analogue output from the Field DAC causes corresponding deflection signals to be applied to the Y deflection plates, of such a conventional CRT display system, without any distortion of the raster pattern associated therewith, it can be arranged that the required rectangular shaped raster scan pattern is provided thereby. However, if such a differential, linearly varying analogue output from the Line DAC 34, and from the Field DAC 36, cause corresponding deflection signals to be supplied, respectively, to the X deflection plates 14, and to the Y deflection plates 16, of a flat screen CRT display system, as described above, the truncated, flute shaped raster scan pattern, shown in FIG. 2, is produced thereby.

In order to modify the truncated, flute shaped raster scan pattern, capable of being produced by the arrangement of FIG. 3 in the manner described above, within this arrangement the Field Correction DAC 35 is provided, and the Field Correction DAC is to operate in accordance with a desired non-linear function, uniformly for each raster scan line, in response to the series of differential digital signals from the Line counter 31. As described in greater detail below, the Line DAC 34 is also required to operate in accordance with a non-linear function, but initially it can be considered to be a DAC operating in accordance with a linear function. The Field DAC 36 is required to operate in accordance with an appropriate linear function, also as described in greater detail below, and in response to the series of differential digital signals from the Field counter 32. A required interaction between the non-linear output of the Field Correction DAC 35 and the manner of operation of the Field DAC 36 is indicated, generally, by a lead 39 therebetween, shown in FIG. 3. The combined manner of operation of the interacting Field Correction DAC 35 and the Field DAC 36 represent a function, representing corresponding variations of the non-linear differential, analogue Field DAC output required, to cause there to be applied to the Y deflection plates 16, appropriate differential deflection signals to correct the distorted, flute shaped raster scan pattern, otherwise produced, in relation to the X axis of the CRT screen 10.

Because, as indicated above, the differential, appropriately stepped analogue current outputs from the Line DAC 34 and the Field DAC 36 are to cause corresponding appropriate voltage deflection signals to be applied, respectively, to the X deflection plates 14, and the Y deflection plates 16, it is convenient to consider subsequently in this specification that the Line DAC and the Field DAC supply the required voltage deflection signals direct to, respectively, the X deflection plates, and the Y deflection plates. The required, differential voltage deflection signals $V_x$ are indicated as being supplied on the two leads 37 from the Line DAC 34; and the required, differential voltage deflection signals $V_y$ are indicated as being supplied on the two leads 38 from the Field DAC 36.

Each of the DAC's 34, 35 and 36, conveniently, has the so-called segmented DAC type of construction. Whilst this form of construction is optional in the case of a DAC operating in accordance with a linear function, such as the Field DAC 36, it is desirable that each DAC operating in accordance with a desired non-linear function, such as the Field Correction DAC 35, has the segmented DAC form of construction, because this form of construction, described in detail below, is suitable to be adapted readily to operate in accordance with a desired non-linear function.

Shown in FIG. 4 of the accompanying drawings is a known form of seven-bit, segmented DAC, initially considered to be linear in operation, and initially considered to be arranged to operate on input signals which are not differential in form, and, in response, to produce a corresponding stepped analogue output which is not differential in form. A set of four most significant bits (MSB's) of each digital input signal to the converter, from say the Line counter 31, is provided to a switching matrix, indicated generally within a dotted line 40. Each set of four MSB's is representative of a digital value comprising a multiple (p) of predetermined binary number (q), (p) having an integral value, including zero, and upto a maximum possible value of (N'−1), N' being equal to sixteen, and (q) equal eight. N' substantially identical current sources, each indicated generally at 42, and comprising an NPN transistor T1 and a resistor R1, are connected to the switching matrix 40. The current sources 42 each have an output (i), shown as entering each source, and considered as representing the predetermined binary number (q).

The (N') sources 42 are connected in parallel to the switching matrix 40. The bases of the transistors T1 are connected to a common rail 43, the collectors are connected to the switching matrix 40, and each of the emitters is connected individually to one end of the associated resistor R1. The other end of each resistor R1 is connected to a common rail 44. The current (i) flows in the collector circuit of each transistor T1.

In response to the receipt by the switching matrix 40 of a set of MSB's, the corresponding number (p) sources 42 are connected to the converter output solely via the switching matrix, and at the converter output there is provided a summed current $I_o'$, which is zero when (p) is zero, and comprises at least part of the corresponding analogue output signal from the converter. A first, or a further, source 42 is connected to the converter output via both the switching matrix and a subdivision system, indicated generally at 45. The subdivision system 45 comprises a known, non-segmented, form of digital to analogue converter (DAC), and usually includes an R—2R network of resistors. The sets of three least significant bits (LSB's) of the digital input signals to the converter, from the Line counter 31, are provided to the subdivision system 45. In response to each set of LSB's the magnitude of the current (i), supplied by the aforesaid source connected thereto, is reduced to the output of the subdivision system, to provide an analogue signal representing the digital value represented by the set of LSB's. The magnitude represented by the analogue signal provided at the output of the subdivision system 45 can have any integral value, including zero, and upto, but not including, the predetermined binary number (q), and instead of representing the predetermined binary number (q). At the converter output, the output of the subdivision system 45 is combined with the summation $I_o'$ of any source outputs supplied thereto solely via the switching matrix 40, so that the analogue output signal $I_o$ from the converter represents the value represented by the whole of the instantaneous digital input signal to the converter.

In the case when the DAC is not arranged to operate upon differential signals, as illustrated in FIG. 4, when a source 42 is not connected to either the converter output, or the subdivision system, the current therefrom is supplied to a sump, not shown, comprising a low impedance load.

If the operation of the segmented converter, and in particular the connection of the sources to the subdivision system 45, is considered, in response to the receipt of the sets of MSB's supplied to the switching matrix 40, there is an order position for each source 42 within the sequence in which the sources are connected to the subdivision system, as the values represented by digital input signals to the converter increase continuously from zero. The sources in the lower order positions in the sequence to that of the source instantaneously connected to the subdivision sytem 45, simultaneously, are connected to the converter output solely via the switching matrix. It is convenient to consider that each of the sources individually, and respectively, within the sequence, represent (p) being zero, and, incrementally, each integral value from unity up to (N'−1), corresponding to the connection of the sources solely to the converter output.

Also for convenience, the switching matrix 40 is considered as including N' bipolar, or three-way, switches 47, of any convenient form. For a DAC arranged to operate upon differential signals three way switches 47 are required. The collectors of the transistors T1 of the current sources 42 are connected individually to an associated predetermined one of the bipolar switches 47. In the sequence referred to in the preceding paragraph, the bipolar switches have order positions which correspond individually to the order positions of the sources 42 connected thereto.

The bipolar switches 47 are shown as being actuated by signals from decoding means, of the switching matrix 40, and indicated generally at 48, the decoding means having N' outputs, each output being connected individually to a bipolar switch. Each output of the decoding means can be considered as corresponding to the set of MSB's which causes there to be provided at the output a signal of a first of two possible forms, to close in the first of two possible ways, individually, the associated bipolar switch, to cause the associated source to be connected to the subdivision system. Consequently, there is a sequence of sets of MSB's corresponding to the sequence of sources, and to the sequence of bipolar switches. The order positions of the sets of MSB's within the sequence correspond individually, and respectively, to the order positions of the sources in the corresponding sequence. These sets of MSB's within the sequence represent, respectively, (p) being zero, and, incrementally, each integral value from unity upto (N'−1). However, when considering each of the sources individually, and respectively, within the sequence with (p) being, in turn, zero, and, incrementally, each integral value from unity upto (N'−1), as referred to above, each of the sources of lower order than the source instantaneously connected to the subdivision system, simultaneously are connected to the converter output solely via the switching matrix. This is in response to the receipt, from corresponding outputs of the decoding means, of signals of the second of the two possible forms, to close the corresponding bipolar switches in the second of the two possible ways.

When the bipolar switches are open, the current outputs of the associated sources are supplied to the sump.

There is shown the ninth bipolar switch 47' closed in the first way, to connect the associated source to the subdivision system 45, in response to the receipt by the decoding means of the appropriate set of MSB's. The sources having the lower order positions in the sequence referred to above, simultaneously, are connected to the converter output solely via the switching matrix. In particular, they are connected to the converter output by the associated bipolar switches being closed in the second of the two possible ways, in response to signals of the second of the two possible forms, respectively, on the associated outputs of the decoding means, preceding the output connected to the bipolar switch 47', closed in the first of the two possible ways, in the predetermined sequence of outputs. Such output signals of the second form are provided by logic means within the decoding means, automatically in response to the receipt by the decoding means of the instantaneous set of MSB's causing the output connected to the bipolar switch closed in the first of the two possible ways.

Thus, there is associated individually with each set of MSB's a corresponding analogue output signal value $I_o'$, of the plurality of different possible analogue output signal values, represented by the different multiples (p) of the output current (i) of each source 42. Further, there is associated with each digital signal considered as a whole, and from the counter 31, a corresponding analogue output signal value $I_o$, represented by the summation of the appropriate multiple (p) of the output current (i) of each source 42, and the current representative of the binary number (q), represented by the set of LSB's instantaneously supplied to the subdivision system 45.

For a segmented DAC, such as the one described above, to operate in accordance with a predetermined non-linear function, conveniently, the resistors R1 in the current sources 42 are not identical, but have different predetermined magnitudes, the relationship between successive resistors R1 of the series being in accordance with the predetermined non-linear function.

If the first constituent raster line scan of the distorted, flute shaped raster scan pattern, described above, is considered, with the start of the raster line being coincident with the top left hand corner of the CRT screen 10, the potential differences of the differential analogue signals $V_y$ applied to the Y deflection plates 16 are required to increase throughout the first raster line scan period (t) in a predetermined non-linear way, to be represented by the desired non-linear function associated with the segmented Field Correction DAC 35. The predetermined non-linear way in which the potential differences $V_y$ applied to the Y deflection plates vary are to cause the first raster line scan to be parallel to the X axis of the CRT screen 10, instead of being curved. Thus, the desired non-linear function in accordance with which the Field Correction DAC 35 is required to operate over the first raster line scan period (t) is the inverse of the non-linear function representing the curved, uncorrected first raster line scan in relation to the X axis of the CRT screen 10. Now assume that the potential differences $V_y$ applied to the Y deflection plates cause the corrected, straight, first raster line to have its required location at the top of the CRT screen 10. Then the potential differences $V_y$, varying non-linearly over the raster line scan period (t) in the same way as for the first raster line, in relation to each raster line considered as a whole, and to cause each of the other raster lines to have their required locations along the Y axis of the CRT screen, are required to differ from each other by a variable, stepped, scaling factor, over the raster frame scan period (T), each constituent step having the duration of a raster line scan period (t). Thus, conveniently, the variable scaling factor is represented by the appropriate linear function, referred to above, in accordance with which the Field DAC 36 is required to operate over the raster frame scan period (T), the Field counter 32, driving the Field DAC, being, in turn, driven by pulses from the Line counter 31, one such pulse being provided in each raster line scan period (t).

Required compensating increases in the potential differences of the differential analogue signals $V_y$ applied to the Y deflection plates 16 are to increase the deflection of the electron beam parallel to the Y axis of the screen in the positive sense when the electron beam is displaced parallel to the Y axis in the positive sense, and are to increase the deflection of the electron beam parallel to the Y axis of the screen in the negative sense when the electron beam is displaced parallel to the Y axis in the negative sense. For the raster scan line period (t) at exactly half-way through the raster frame scan period (T), when the corresponding raster scan line is coincident with the X axis of the screen, both in the desired rectangular raster scan pattern, and in the distorted, flute shaped raster scan pattern, no correcting increase of the deflection of the electron beam parallel to the Y axis, and of either sense, is required.

The appropriate combination of the predetermined non-linear function, uniform for each raster line scan period (t), in relation to the potential differences $V_y$ of the differential analogue signals required to be applied to the Y deflection plates 16, and the appropriate linear function representing variations of the potential differences $V_y$ of the differential analogue signals required to be applied to the Y deflection plates 16 over a raster frame scan period (T), comprises a function which is the inverse of the function capable of representing the distorted, flute shaped raster scan pattern in relation to the X axis of the screen, and is representative of the compensating potential differences $V_y$ of differential analogue signals required to be applied to the Y deflection plates in order to correct the flute shaped distortion, and to obtain the desired rectangular raster scan pattern.

Initially ignoring the variable scaling factor, the potential differences $V_y$ of differential signals applied to the Y deflection plates 16 are to increase in the predetermined non-linear way, to be represented by the desired non-linear function associated with the manner of operation of the Field Correction DAC 35, uniformly for each constituent raster line scan period (t) of the raster pattern, and the Field Correction DAC is required to be driven by differential digital signals from the Line counter 31. As indicated in FIG. 3, the non-linear variation of the differential analogue signals $V_{y1}$ from the Field Correction DAC, over each raster line scan period (t), and representative of corresponding non-linear variations in the potential differences $V_y$ of differential analogue signals to be applied to the Y deflection plates 16, can be represented by a graph, the shape of which graph is the inverse of the shape of the first raster line otherwise obtained in relation to the X axis of the CRT screen 10. Thus, the differential signals $V_{y1}$ vary, in the predetermined non-linear way, from representing zero to a maximum positive value over the raster line scan period (t).

The Field Correction DAC 35 operates in accordance with the predetermined non-linear function by the successive resistors R1 in the current sources 42 having different predetermined magnitudes, the relationship between successive resistors of the series being in accordance with the predetermined non-linear function, and the desired resistances may be determined in an empirical manner. The Field Correction DAC 35 is a seven-bit DAC, driven by digital signals from the seven-bit line counter 31, there being between 64 and 128 constituents pixels in each raster scan line. Conveniently, the segmented Field Correction DAC 35 has sixteen constituent segments, or current sources 42, so that there are sixteen groups of constituent steps in the stepped analogue output from the Field Correction DAC, within each group of steps there being eight uniform steps, there being non-uniform variations only between each group of steps, each group being considered as a whole. The arrangement adequately represents the required non-linear function.

The constituent function, of the combined function referred to above, the constituent function representing variations of the potential differences $V_y$ required to be applied to the Y deflection plates 16 over a raster frame scan period (T), and comprising the appropriate stepped linear function, conveniently, to be represented by the required manner of operation of the Field DAC 36, requires the Field DAC to be driven by differential digital signals from the Field counter 32.

In particular, as indicated in FIG. 3, it is required that the appropriate linear function in accordance with which the Field DAC 36 is required to operate, when considered alone, is such that the compensating potential differences $V_{y2}$, of differential analogue signals from the Field DAC, over any raster frame scan period (T), causes, when supplied to the Y deflection plates 16, an electron beam deflection which is zero half way through the raster frame scan period (T). The electron beam deflection decreases linearly in the first half of the raster frame scan period, from a maximum positive value of the first raster line scan, and increases linearly in a negative sense in the second half of the raster frame scan period, having a maximum negative value for the final raster line scan, equal in magnitude to the maximum positive value for the first raster line scan. Thus, the shape of the graph of the potential differences $V_{y2}$ over the raster frame period (T) is a straight line having a predetermined negative slope, and comprises a representation of the appropriate linear function in accordance with which the Field DAC 36 is required to operate, and of the variable scaling factor referred to above.

The variable scaling factor, or the appropriate linear function, to be introduced by the Field DAC 36, is inherently introduced by the successive equal resistors R1 in the current sources 42 of the Field DAC 36. The Field DAC 36 is, at least, a nine-bit DAC, driven by digital signals from the nine-bit Field counter 32, there being between 256 and 512 constituent raster lines in each raster frame. Conveniently, the segmented Field DAC 36 has sixteen constituent segments, or current sources 42, each corresponding to a small multiple of the constituent raster lines in the raster scan pattern. Each of the 512 constituent steps of the stepped differential analogue output from the Field DAC 36 is uniform, as is required.

FIG. 5 corresponds to FIG. 4 but shows the arrangement of a nine-bit, segmented DAC in greater detail. In particular, the DAC shown in FIG. 5 is the Field DAC 36, and unlike the DAC shown in FIG. 4, is shown in a form suitable to receive digital differential signals from the Field counter 32, and, in response, to provide a corresponding stepped analogue output which is differential in form.

Each three-way switch 47 comprises three bipolar transistors T2, with their emitters connected to the associated current source 42. The bases of the transistors T2 are connected to the decoder 48 (not shown in FIG. 5), to receive signals therefrom. In FIG. 5, one discrete part of such a decoder output is designated S1, another part S2, and the third part S3, a signal from each such part being capable of being supplied, individually, to one of the three transistors T2. There are three such constituent parts S1, S2 and S3 for each decoder output, connected individually to the sixteen switches 47. The collector of each transistor T2 associated with a decoder output part S1 is connected to one input 50 of a differential amplifier 01; and the collector of each transistor T2 associated with a decoder output part S2 is connected to the other input 51 of the differential amplifier. The collector of each transistor T2 associated with a decoder output part S3 is connected to one end of the five-bit R—2R ladder network 45 of the subdivision means 45. Each of the thirty-two stages of the R—2R ladder network is connected, individually, to a two way switch 52, and comprising two bipolar transistors T3, with their emitters connected to the associated stage of the ladder network. The bases of the transistors T3 are connected, individually, to output parts L1 and L2, from each of the LSB stages of the Field counter 32, to receive signals therefrom. The collector of each transistor T3 associated with a counter output part L1 is connected to the same input 50 of the differential amplifier 01 as each transistor T2 associated with a counter output part S1. The collector of each transistor T3 associated with a counter output part L2 is connected to the same input 51 of the differential amplifier 01 as each transistor T2 associated with a decoder output part S2. There are two such constituent parts L1 and L2 for each of the LSB stages of the Field counter 32. Two signals are received simultaneously by each switch 52 from each associated pair of counter output parts L1 and L2, and together comprise a digital differential signal from the corresponding LSB counter stage. The end of the ladder network 45 remote from the connection to the transistor T2 associated with the decoder output part S3, is connected to a rail 50 maintained at a supply potential V2, via a diode D1. The two inputs of the differential amplifier 01 are also connected to the rail 53, by resistors R2. The two outputs of the differential amplifier 01 comprise the leads 38, on which are provided the two parts of the differential signals $V_{y2}$, from the Field DAC 36, and comprising a factor of the differential $V_y$ to be applied to the Y deflection plates 16.

In operation, if the ninth switch 47' is considered, and connects the associated current source 42 to the subdivision system 45, as in the arrangement of FIG. 4, a signal is provided from the associated output part S3 of the decoder 48, and the appropriate transistor T2 is rendered conducting. Instantaneously, appropriate LSB stages from the Field counter 32 each provides a signal from the corresponding counter output parts L1, to the corresponding switches 49, and, in particular, the appropriate transistors T3 connected to said one input 50 of the differential amplifier 01 are rendered conducting, by the signals, from the associated counter output parts L1, being supplied to the bases thereof.

All the decoder output parts S1 of decoder outputs of lower order in the sequence of such decoder outputs than the ninth, each supply a signal to the transistor T2 connected thereto, to render these transistors T2 conducting, and a current $I_o'$ flows into these current sources. Because of the appropriate transistors T3 of the switches 52 also being rendered conducting, by signals from counter output parts L1, current also flows through the subdivision means 45 to the ninth current source, the total current flowing from said one input 50 of the differential amplifier 01 being $I_o$.

Simultaneously, all the decoder output parts S2 of decoder outputs of higher order in the sequence of such decoder outputs than the ninth, each supply a signal to the transistor T2 connected thereto, to render these transistors T2 conducting, and a current $I_o'$ flows into these current sources. Two signals are received simultaneously by each switch 47, except the switch 47' receiving a signal from a decoder output part S3, from the associated pair of decoder output parts S1 and S2, and together comprise a digital differential signal therefrom. The transistors T3 of the remaining switches 52, not receiving signals from the counter output parts L1, are also rendered conducting, by signals from counter output parts L2, and a current also flows through the subdivision means 45 to the ninth current source. The total current flowing from said other input 51 of the differential amplifier 01 is $I_o$.

It will be appreciated that $I_o + I_o$ is equal to the instantaneous total current flowing through the DAC, but is not a constant.

The arrangement is such that the differential output $V_{y2}$ from the differential amplifier 01 is proportional to the instantaneous value for $(\underline{I}_o - I_o)$. At the start of each operating cycle of the Field counter 32, $\underline{I}_o$ has its maximum value, and $I_o$ is zero. Hence, the differential output $V_{y2}$ has its maximum positive value, as required. The value for $V_{y2}$ then falls steadily, until, half way through the operating cycle, at a time $(T)/2$, $\underline{I}_o = I_o$, and the value for $V_{y2}$ is zero, as required. Then $I_o$ becomes greater than $\underline{I}_o$, and the differential output $V_{y2}$ goes negative. The negative value of $V_{y2}$ rises steadily through the second half of the operating cycle of the Field counter 32, until, at the end of the operating cycle, at a time $(T)$, $\underline{I}_o$ is zero, and $I_o$ has its maximum value, equal to the maximum value of $\underline{I}_o$ at the start of the operating cycle. At this time $(T)$ the differential output $V_{y2}$ has its maximum negative value, equal in magnitude to its maximum positive value, as required.

In addition to the magnitudes associated with the analogue output of such a linear, or non-linear segmented DAC varying in accordance with the values represented by differential digital input signals thereto, the analogue output magnitudes also vary in accordance with changes in the reference voltage V1, shown in FIGS. 4 and 5, applied between the rails 43 and 44 connected, respectively, to the bases of the transistors T1 of the constant current sources 42, and the ends remote from the transistors T1 of the resistors R1 of the current sources, of the DAC.

The required interaction of the differential analogue output of the non-linear Field Correction DAC 35 with the operation of the linear Field DAC 36, in the appropriate manner, is obtained by arranging that the reference voltage V1', applied between the rails 43 and 44 of the Field DAC, varies with the non-linear analogue output of the Field Correction DAC, as indicated by the provision of the lead 39 in FIG. 3. In particular, the differential analogue output $V_{y1}$ of the Field Correction DAC 35 is provided on two leads, but, for convenience, only one such lead 39 is shown in FIG. 3. One lead is connected to the rail 43 of the DAC, and the other lead is connected to the rail 44 of the DAC. However, as stated above, in representing the required factor of the differential analogue signal $V_y$ to be applied direct to the deflection plates, the corresponding differential output $V_{y1}$ from the Field Correction DAC is required to vary in a non-linear way only between representing zero, and a maximum positive value. Hence, it is convenient to arrange that the potential supplied to the rail 44, connected to the resistors R1 of the current sources of the Field DAC 36, and comprising one constituent part of the differential output, is always zero, and only the potential on the rail 43, connected to the bases of the NPN transistors T1 of the current sources of the Field DAC, and comprising the other constituent part of the differential output, varies, only between zero, and a maximum positive value. Thus, the gain of the Field DAC 36 is caused to vary in accordance with the non-linear differential output of the Field Correction DAC 35. Hence, the analogue output of the linear Field DAC is not linear, and is in accordance with the combined function, representing non-linear variations of the compensating potential differences $V_y$ required to be applied across the Y deflection plates 16 in order to correct the distorted, flute shaped raster scan pattern, otherwise obtained.

In particular, and again initially ignoring the variable scaling factor, $V_{y2}$, associated with the Field DAC 36, it is required that at any instant within the first raster line scan period (t), considered individually, within a raster frame scan period (T), the varying reference voltage V1' applied between the rails 43 and 44 of the Field DAC 36, as the variable gain thereof, is given by the expression:

$$V1' = V1 + V_{y1}$$

where V1 is the constant output voltage of a reference source. The instantaneous voltages V1' applied between the rails 43 and 44 of the Field DAC are those required to provide the required straight raster scan line parallel to the X axis of the CRT screen. At the start of the raster line scan period V1' has the value of V1. At the end of the raster line scan period, V1' has its maximum possible value, and the instantaneous reference voltage V1' applied between the rails 43 and 44 of the Field DAC, at any instant in the raster line scan period (t), and comprising the variable gain of the Field DAC, as is required, is arranged to compensate for the curved raster line, otherwise obtained.

At the output of the Field DAC 36 the above expression is modified to include the variable scaling factor, $V_{y2}$, in the following manner:

$$Y_y = V_{y2}(V1 + V_{y1})k$$

where $V_{y2}$ is represented by the appropriate linear function in accordance with which the Field DAC operates over the raster frame scan period (T), varying between a maximum positive value, and an equal negative value; and k is a constant, equal to the reciprocal of the maximum value for $V_{y2}$. Thus, each constituent raster line of the raster scan pattern is straight in form, and each has its required location along the Y axis of the CRT screen 10. Hence, the different constituent portions, or steps, of the stepped analogue output $V_y$ from the Field DAC, the portions being considered as being discrete, are capable of causing, individually, each constituent raster line of a raster pattern.

The variations of the differential output $V_{y1}$ from the Field Correction DAC 35, and applied between the rails 43 and 44 of the current sources 42 of the Field DAC, do not adversely affect the manner of operation of the Field DAC, by causing corresponding, and undesired, variations in the currents $I_o$ and $\underline{I}_o$ flowing in relation to the differential amplifier 01, and only cause the desired variations in the gain of the Field DAC. This is because the Field DAC is arranged to operate upon digital differential signals, and, in response, to provide a differential, analogue output.

Alternatively, the arrangement of FIG. 3 may be such that the first raster line scan, of the distorted flute shaped raster scan pattern, intersects the top right hand corner of the CRT screen 10, instead of the top left hand corner of the screen as shown in FIG. 2. Consequently, the function representative of the non-linear output of the Field correction DAC 35, at the start of each operating cycle of the Line counter 31, has a maximum positive value, and falls steadily to zero, at the end of the Line counter operating cycle. The function representative of the linear output of the Field DAC 36 is required to have a positive slope, having a maximum negative value at the start of each operating cycle of the Field counter 32, and a maximum positive value at the end of the operating cycle, and zero value midway therebetween.

FIG. 6 corresponds to FIG. 3, except that the oscillator 30, and the connection between the Line counter 31 and the Field Divider 32, are omitted for the sake of clarity. Further, the arrangement has been redrawn to show how the constant reference voltage V1 is applied to each of the DAC's 34, 35 and 36, and in particular how the reference voltage V1' to the Field DAC 36 is caused to vary in the required manner in response to the non-linear analogue output $V_{y1}$ of the Field Correction DAC 35, in order to provide the required interaction between these two DAC's, indicated generally by the provision of the lead 39 in FIGS. 3 and 6. For convenience, the reference voltages to the DAC's 34, 35 and 36 are not shown as being differential in form, but each such reference voltage is of differential form.

In relation to FIG. 6, a common reference voltage source is indicated generally at 60, the constant output V1 therefrom being shown as being connected directly both to the Line DAC 34, and to the Field Correction DAC 35, and is shown as being connected to the Field DAC 36 via a known form of summing means indicated generally at 62. The varying analogue output $V_{y1}$ of the Field Correction DAC 35 is supplied to a positive input of the summing means 62, and is considered as providing the required compensating voltage indicated above, to be added to the constant output V1 of the reference voltage source 60 before the correspondingly varying reference voltage V1' is supplied to the Field DAC 36.

Attenuation means, not shown, may be provided between each DAC 34, 35 and 36, and the common voltage source 60, so that the appropriate reference voltages to cause a raster scan pattern of the same size, and shape, as the CRT screen 10 to be produced.

A suitable form of interface circuit between the output leads 38 from the Field DAC 36, carrying the analogue differential output from the DAC, and the Y deflection plates 16, is shown in FIG. 7. Each lead 38 is connected, individually to the base of a bipolar transistor T4. The collector of each transistor T4 is connected to a rail 70 maintained at the extra high voltage $V_{EHT}$ associated with the CRT, via a resistor R3. The Y deflection plates 16 are connected, individually, to a point 71 between a transistor T4 and the associated resistor R3, in order to have the differential signals from the Field DAC superimposed upon a desired, high common mode potential, corresponding to $V_{EHT}$, at the Y deflection plates 16. In order for the circuit to have an appropriate minimum gain, the emitter of each transistor T4, individually, is connected to a rail 72 maintained at zero potential, respectively, via a resistor R4. The minimum gain is then controlled by the ratio R3/R4. Connected in parallel with each other, between the points 73 between each transistor T4 and the associated resistor R4, is a variable resistor R5, so that the gain of the interface circuit can be adjusted. A capacitor C1 is also provided between the points 73 to compensate for the capacitance associated with the deflection plates 16.

Equivalent interface means may be provided between the output leads 37 from the line DAC 34 and the X deflection plates 14.

Also indicated in FIG. 2 are dotted lines 26 which represent lines of equal times from the start of each raster scan period (t), the lines 26 being both for the uncorrected, truncated flute shaped raster scan pattern, and the desired rectangular raster scan pattern produced in response to the analogue outputs from the Line DAC 34, and the Field DAC 36, respectively, on the leads 37 and 38, in the arrangement of FIG. 3 as so far described. Conveniently, the lines 26 represent linear portions of the display, which are required to be straight, and to be parallel with each other, and to be uniformly spaced, in a similar manner to the raster line scans. Any deviation from such an arrangement of the lines 26 is representative of the distortion in the display due to the cause of the deviation of the arrangement of the lines 26, in a similar manner to the distortion caused by the uncorrected raster scan pattern referred to above. It can be considered, to a close approximation, that the dotted lines 26 are straight lines, extending at right angles to the X axis, or the longitudinal axis of symmetry, of the CRT screen 10. There are shown in FIG. 2 five lines 26 which are equi-distributed in time throughout each raster line scan period (t). It can be seen, however, that there is not the desired uniform spacing between the illustrated dotted lines 26, in relation to the CRT screen 10, and because of this the display provided would be distorted. From the start of each raster scan line period, the spacings on the CRT screen 10 between adjacent pairs of illustrated dotted lines 26 decreases in a non-uniform manner, because of the differences in the electron beam paths as the electron beam traverses the raster scan line, and as illustrated in FIG. 1. In order to correct for this distortion of the display it is necessary to arrange that the scanning speed of the electron beam along each raster scan line increases in a complementary, non-uniform manner, the variations in the scanning speed being the same for each raster scan line, when the lines 26 of equal times are considered to be straight lines. The required increases in scanning speed are obtained by providing corresponding increases in the potential differences $V_x$ of the differential signals applied to the X deflection plates 14, from the output of the Line DAC 34, uniformly for each raster line scan.

One way of obtaining such required non-linear increases in the scanning speed of the electron beam, uniformly for each raster line, is by arranging the Line DAC 34 to operate in accordance with a required non-linear function, the Line DAC still being driven by differential digital signals from the Line counter 31. This function is, at least substantially, exponential in form, an exponential function, to a close approximation, representing the required, corresponding, non-linear increases in the potential differences $V_x$ of the differential analogue signals to be applied to the X deflection plates 14. As indicated in FIG. 3, the exponential variation of the differential analogue signals $V_{x1}$ from the Line DAC, over any raster scan line period (t), and representative of corresponding exponential variations in the potential differences $V_x$ of differential analogue signals to be applied to the X deflection plates 14, can be represented by a graph, the shape of which graph is the inverse of the shape of the graph of the amount distortion of linear portions of the display parallel to the Y axis, otherwise obtained, in relation to the spacings of the linear display portions along the X axis of the CRT screen 10. Thus, the differential signals $V_{x1}$ vary from representing zero, to a maximum positive value, uniformly, over each raster line scan period (t).

The required non-linear output of the segmented Line DAC 34 is determined in an empirical manner, and is represented by the non-linear relationship between successive resistors R1 of the series of current sources 42 of the Line DAC. As described above in relation to FIG. 4, the Line DAC 34 has sixteen constituent segments, or current sources 42. In particular, several of the lower order resistors R1, within the series of resistors, are arranged to be infinite, so that the function, in accordance with which the Line DAC operates, initially has a significant portion representing a zero potential difference output $V_{x1}$ for the DAC. Then the stepped potential difference output of the DAC increases rapidly, in accordance with the required exponential function, the resistances within the current sources decreasing rapidly throughout the series of sixteen resistors R1.

The exponential function associated with the manner of operation of the Line DAC, and referred to above, is required to be combined with an appropriate linear function, generated in any convenient way, and similar to, but not identical with, the linear function described above in relation to the Field DAC, and to cause the Line DAC to provide each raster line scan.

Thus, the non-linear differential analogue output from the Line DAC 34, on the two leads 37, corrects for distortion due to the straight lines 26 of equal times, and which are equi-distributed in time throughout each raster line scan period, but not being uniformly spaced in relation to the CRT screen 10.

Hence, the operation of the DAC's 34, 35 and 36, can be considered as mapping, in a dynamic sense, any irregularity of the raster scan pattern otherwise produced on the screen 10 of the CRT tube, the DAC's operating to be the equivalent to an analogue memory in the respect. It is possible that each DAC operates in accordance with a function which has one, or more, non-linear components, and a linear component.

In general, it can be considered that the combination of the Field DAC 36 and the Field Correction DAC 35 is capable of shifting pixels, of the raster scan pattern, possibly individually, parallel to the Y axis of the CRT screen 10, when the raster scan pattern varies along the X axis. Similarly, it can be considered that the Line DAC 34 is capable of shifting pixels, possibly individually, parallel to the X axis of the CRT screen 10, when there is otherwise distortion of the display produced, the amount of such distortion varying along the X axis, uniformly for each raster line scan.

The use of the DAC's 34, 35 and 36, in correcting for distortion of the raster scan pattern, otherwise produced, is advantageous in that it enables the means to generate the required functions, to be employed to shape the waveforms to be applied to the deflection plates 14 and 16, to operate satisfactorily without having to consider the effects of variations in the operating temperatures of the means, or of variations in the supply voltage to drive the means. Conveniently, appropriate compensations for inadvertent variations of the operating temperature, and/or of the supply voltage, can be made at the outputs of the DAC's, and before the differential analogue outputs of the DAC's are applied to the deflection plates.

It is possible to apply the output of the Line DAC 34 to integrating means generating a conventional raster line scan sawtooth waveform, so that the energy consumption of the arrangement is less than otherwise would be the case, the output of the Line DAC being in accordance solely with the non-linear function referred to above, and modifying in the required manner the sawtooth waveforms. Thus, the integrated output of the Line DAC encodes electron beam scanning speed, and not pixel positions, in relation to each raster line scan.

If the Line DAC output is integrated, as described below, the subdivision system 45 is omitted in Line DAC 34, and, hence, the switches 47 are only two-way switches instead of the three-way switches otherwise required. Thus, the steps of the stepped analogue output from the Line DAC each represent multiplies of pixel positions. Otherwise the Line DAC 34 operates in the manner described above for a segmented DAC. This manner of operation of the Line DAC is adequate.

Because the output from the Line DAC 34 is of a differential form, being provided on two leads 37, a suitable arrangement for applying the stepped, exponentially varying, output from the Line DAC 34 to the integrating means is shown in FIG. 8. Each constituent part of the differential output is supplied to an integrator 80, each integrator 80 comprising a capacitor C2 in parallel with an amplifier 02, and is arranged to have a time constant equal to the raster line scan period (t). The two integrated parts of the differential signal are then supplied, individually, to the two X deflection plates 14. Hence, the deflection signals supplied to the X deflection plates comprise a smoothly continuous waveform in each raster line scan period (t), the waveform varying in the desired way. The extra high voltage $V_{EHT}$ associated with the CRT is applied to each amplifier 02.

The flat screen CRT display system described above, in relation to the present invention, comprises a TV receiver arranged to operate in accordance with, say, two, different transmission systems, for example, the United States 525 display frame line transmission system, and the European 625 display frame line transmission system.

It is usual for a display frame for a TV receiver to comprise two interlaced raster scan fields. Hence, for a 525 line display frame, one raster scan field is required to have 262 constituent raster line scans, and the other raster scan field is required to have 263 constituent raster line scans. Similarly, for a 625 line display frame, one raster scan field has 312 raster scan lines, and the other raster scan field has 313 raster scan lines. Consequently the Field counter 32 in the flat screen TV receiver described above is required to be a shift register capable of being considered as having 512 constituent stages, the Field counter being a nine-bit counter, as described above.

A convenient way for the TV receiver to detect in accordance with which of the two constituent fields of each frame it is required instantaneously to display, is for a known form of detection means to determine whether the instantaneous raster scan field is to terminate at one-quarter, or three-quarters of the distance along the final raster scan line. If the raster field is to terminate at the one-quarter point of the final raster line the raster field provides the odd numbered frame lines, and if the raster field is to terminate at the three-quarter point of the final raster line the raster field provides the even numbered frame lines. Thus, if the detector detects a raster field terminating at the one-quarter point of the final raster line, the next field is required to be the even numbered frame lines raster field, and vice versa. In a known manner the required detection means produces a pulse on one of two leads indicative of which of the two constituent fields of each frame the TV receiver is next required to display. For convenience these pulses are referred to herein as P1 and P2, for the next raster field, respectively, to be the even numbered frame lines raster field, and to be the odd numbered frame lines raster field. These pulses, also, are arranged to provide a corresponding single-bit odd/even digital signal.

As stated above, in relation to the description of FIG. 3, the Field DAC 36 is, at least, a nine-bit DAC, and is driven by the digital signals from the nine-bit Field counter 32. The segmented Field DAC 36 has sixteen constituent segments, or current sources 42, each corresponding to a small multiple of the constituent raster lines in the raster scan pattern. In fact the Field DAC 36 is required to be a ten-bit DAC, the constituent subdivision system 45 thereof comprising a six-bit DAC, in the form of a R−2R resistor network. Hence, the different constituent portions, or steps, of the stepped analogue output $V_y$ from the Field DAC, the portions being considered as being discrete, are capable of causing, individually, each of 525, or 625, display frame lines, and not merely the raster lines of either of the two interlaced constituent raster fields, considered individually.

In particular, in addition to the Field DAC 36 being driven by the digital signals from the nine-bit Field counter 32, as referred to above, the Field DAC is also driven by the single-bit odd/even digital signal, the odd/even digital signal providing the least significant bit (LSB) for the Field DAC, and the Field counter providing the most significant bits (MSB's) for the Field DAC. The appropriate, instantaneous, LSB, of one of the two possible forms, is provided to the Field DAC throughout an operating cycle of the Field counter, whilst the series of nine-bit digital signals are provided to the Field DAC from the Field counter, to cause one raster field scan to be produced. In the next operating cycle of the Field counter the appropriate instantaneous LSB supplied to the Field DAC throughout the operating cycle, to cause the other constituent, interlaced, raster field scan of the required frame display to be produced, has the other of the two possible forms. Thus, said one raster field scan comprises the odd numbered frame lines, and said other, interlaced, raster field scan comprises the even numbered frame lines, or vice versa. Hence, the LSB is required to be provided to the Field DAC 36 in each of its two possible forms, considered individually, throughout alternate operating cycles of the Field counter 32. Conveniently, the single-bit odd/even digital signal is supplied direct to the Field DAC.

In addition, for a TV receiver comprising a flat screen CRT display system as described above, having at least the Field counter 32, and the Field DAC 36, in order to provide the required undistorted raster scan pattern, it is convenient also to provide means whereby, in response to the TV receiver detecting broadcast field synchronism (sync) pulses, and determining whether they relate to the 525, or the 625, display frame line transmission system, the TV receiver is arranged to provide automatically the required raster scan pattern for the appropriate transmission system.

As indicated above, each constituent digital signal from the Field counter 32 to the Field DAC 36, in the series of digital signals provided in each operating cycle of the Field counter, represents the corresponding raster line in the series of raster lines comprising a raster field. Each such digital signal also represents the number of pulses instantaneously accumulated in the Field counter 32. Hence, it is convenient to consider that there are 512 constituent stages of the nine-bit Field counter, with each stage corresponding to the related constituent raster line in the 262/263 or 312/313 line raster field, even though the raster line is provided in response to the appropriate nine-bit digital signal from the counter.

Irrespective of whether the TV receiver is arranged to operate upon the 525, or the 625, display frame line transmission system, because of the manner of the operation of the Field DAC 36 as described above in relation to FIG. 5, inherently, the centre raster line of each raster field is coincident with the longitudinal axis of symmetry, or X axis, of the CRT screen, with each raster field scan effectively divided into two halves, of different senses in relation to the Y axis of the screen.

Thus, the Field counter 32 can be arranged not to count over all its 512 constituent stages, but to count from, not before, the 100th stage, to at most the 420th stage, as required, and as described in greater detail below. This implies that the first two, and the final two, segments, or constituent current sources 42, of the sixteen segment Field DAC 36 can be omitted. The third segment, conveniently, is required in order to maintain balance within the Field DAC when the Field counter provides a digital signal to the Field DAC corresponding to the 256th, centre, divider stage, because such a condition is required for convenience, the Field DAC being arranged to operate upon digital signals of a differential form. Initially, ignoring the first, odd, raster line, as referred to above, in each 263 line raster field scan, or 313 line raster field scan, the centre raster line of either form of raster field pattern, therefore, is arranged to be coincident with the X axis, or the longitudinal axis of symmetry, of the CRT screen 10. However, when the Field counter 32, and the Field DAC 36, start each operating cycle, they are required to produce signals corresponding to the first, upper, raster line, and not the centre raster line, in the raster field pattern, and both the Field counter and the Field DAC are required to reset to where they provide signals corresponding to the start of each operating cycle.

Logic means is provided, arranged to control the manner of operation of the Field counter 32 in the required two possible ways, the logic means having two possible modes of operation, the logic means to provide the appropriate control for the Field counter automatically in response to the logic means detecting where in each operating cycle of the Field counter, or raster field, broadcast field sync pulses occur, and determining whether they relate to the 525, or the 625, display frame line transmission system. The logic means provides the required control for the Field counter by pre-loading a count of either 100, or 125 into the Field counter 32, so that, as shown in the representation of FIG. 9, the representation being in relation to the 512 constituent stages considered to be included in the nine-bit Field counter, respectively, the digital signal in relation to the 101st counter stage, or the 126th stage, is supplied to start to drive the Field DAC in each raster field period. Simultaneously, and respectively, the Field counter should terminate at the 412th stage, and the 387th stage. Thus, for the 625 display frame line transmission system the Field counter is required to divide by 312, starting with the 101st stage of the counter, having the 256th stage as the centre stage, and terminating with the 412th stage. For the 525 display frame line transmission system the Field counter is required to divide by 262, starting with the 126th stage of the counter, having the 256th stage as the centre stage, and terminating with the 387th stage. The Field counter 32 is required to be of a parallel-loadable form.

The logic means, shown in FIG. 10, is required to be in one or other of its two possible modes of operation in response to the field sync pulses being detected thereby, these field sync pulses comprising narrow width pulses, one such pulse being capable of being considered to be at the end of each field. A signal corresponding to a field sync pulse, provided to the Field counter 32, usually, but not inevitably, causes the Field counter to reset.

In order to illustrate the manner of operation of the logic means in this respect, it is convenient to consider relative times in each raster field period (T) by considering the relative order positions of stages of the Field counter 32 considered as instantaneously being associated with providing digital signals to drive the Field DAC 36. For convenience, the relative times in each raster field period are described by referring to the stage order portions instantaneously associated with the corresponding digital signals to drive the Field DAC 36, and hence the appropriate relative times are also instantaneously associated with the corresponding raster lines of the raster field pattern.

Initially, a constituent portion 100 of the logic means, referred to as the wide window logic, is arranged to detect whether or not a field sync pulse occurs during a relatively wide window in each raster field scan period, the wide window, say, extending from the 315th to the 420th counter stages. This window is made as wide as possible, so as to ensure that a field sync pulse is detected within the window as soon as possible, but the wider the window the more likely is a noise signal to be unintentionally detected as the field sync pulse. The field sync pulses are supplied to the wide window logic 100 on a lead 110.

Upon the start of the operation of the logic means, with the logic means, randomly, in either of its two possible required modes of operation, the first field sync pulse can occur coincidentally with the digital signal associated with any counter stage and there is not caused to be pre-loaded any count into the counter.

In the operation of the wide window logic 100, upon the start of the operation of the logic means, if at the effective end of the part of the first operating cycle of the Field counter 32 corresponding to the digital signal associated with the 420th counter stage, at the end of the wide window, the appropriate timing signals being supplied to the wide window logic 100 on a lead 112 from the 315th counter stage, and on a lead 114 from the 420th counter stage, there has not been detected a field sync pulse within the wide window, a reset signal is provided to the counter on a lead 116 from the wide window logic; no signal is provided on the output lead 118 from the wide window logic 110, and there is not caused to be pre-loaded any count into the counter before its next operating cycle. In this condition, however, the mode of operation of the logic means remains random. By not pre-loading any count into the counter before the next operating cycle, a field sync pulse occurs at a different time within the next appropriate Field counter operating cycle. In the next operating cycle of the Field counter this operation of the wide window logic 100 is repeated. If a field sync signal is again not detected within the wide window, the operation of the wide window logic is repeated, in a continuously repetitive manner, until a field sync pulse is detected within the wide window by the wide window logic. Thus, it is ensured that a field sync pulse will occur within the wide window within the 4th field period. When a field sync pulse is detected within the wide window, the Field counter is caused to reset by a signal, corresponding to the field sync pulse, being provided on the lead 116; a count of 100 is caused to be pre-loaded into the counter before its next operating cycle by a signal being provided on the lead 118; and another constituent portion 120 of the logic means becomes enabled by a signal being provided thereto from the wide window logic 100 on a lead 122. The signal on the lead 118 is provided to a logic device indicated generally at 124, and, in response, a signal is provided on a lead 126 to loading means indicated generally at 128. The required count of 100 is provided on a lead 130 to the counter.

The other constituent portion 120 of the logic means referred to in the preceding paragraph, also is arranged to detect whether or not a field sync pulse, supplied thereto on the lead 110, occurs in an associated window in each operating cycle of the Field counter 32. This portion 120 of the logic means is referred to as the 525/625 decision logic. The associated window starts coincident with the start of the wide window referred to above, the appropriate timing signals being supplied to the 525/625 decision logic 120 from the 315th counter stage on the lead 112, but the 525/625 decision window is not as wide as the wide window, extending between the 315th to the 400th counter stages. Timing signals from the 400th counter stage are supplied to the 525/625 decision logic 120 on a lead 132. The later extremity of the 525/625 decision window is mid-way between the 387th and 412th counter stages, when the Field counter provides the final digital signals to drive the Field DAC to cause, respectively, each raster field scan pattern for the 525 line frames, and to cause each raster field scan pattern for the 625 line frames.

In the operation of the 525/625 decision logic 120, after the detection of a field sync pulse within the 315th to 420th counter stages of the wide window, by the wide window logic 100, it is determined whether the field sync pulse is within the part of the wide window between the 315th to 400th counter stages and within the 525/625 decision window, or whether the field sync pulse is within the part of the wide window outside the 525/625 decision window, namely, between timings of the digital signals associated with the 410st and 420th counter stages. If the field sync pulse is determined to be between the timings of the digital signals associated with the 401st and 420th counter stages, there is continued to be caused to be pre-loaded a count of 100 into the Field counter before each of its operating cycles, corresponding to the detection of a field sync pulse of a 625 line frame, and in response to signals on lead 118 from the wide window logic 100.

Alternatively, if the field sync pulse is determined to be within the 525/625 decision window, between the 315th and 400th counter stages, it is possible to assume that the field sync pulse is in relation to the 525 frame line transmission system, and the field sync pulse should occur at the 362th stage. The 525/625 decision logic 120, therefore, causes there to be pre-loaded a count of 125 into the Field counter before its next operational cycle, corresponding to the detection of a field sync pulse of a 525 line frame. The 525/625 decision logic 120 causes the count of 125 to be preloaded into the counter by providing a signal on a lead 134 to the logic device 124. In response to the logic device 124 receiving both the signal on the lead 118 from the wide window logic 100, and the signal on the lead 134 from the 525/625 decision logic 120, instead of providing a signal on the lead 126 to the loading means 128, the logic device 124 provides a signal on a lead 136 to loading means 138. In response, the loading means 138 causes the required count of 125 to be provided on a lead 140 to the counter.

Simultaneously with the operation of the wide window logic 100, and the 525/625 decision logic 120, other logic means 150, designated the 525 logic, also determines whether, or not, the field sync pulse is detected within a four counter stage wide window about the 387th stage, which is the required stage for the field sync pulse to be detected for the 525 display frame line transmission system, from the 385th to the 388th stage inclusively; and other logic means 152, designated the 625 logic, also determines whether, or not, the field sync pulse is detected within a four counter stage wide window about the 412th stage, which is the required stage for the field sync pulse to be detected for the 625 display frame line transmission system, from the 410th to the 413th stages inclusively. The field sync pulses are supplied to the 525 logic 150, and to the 625 logic 152, on leads 110. The appropriate timing signals are supplied to the 525 logic 150 on a lead 154 from the 384th counter stage, and on a lead 156 from the 388th counter stage. The appropriate timing signals are supplied to the 625 logic 152 on a lead 158 from the 409th counter stage, and on a lead 160 from the 413th counter stage. The required reset pulses are supplied to the Field counter, now, on a lead 178 or 180, respectively, from the 525 logic, and the 625 logic, in response to the receipt thereby of the field sync pulses. If a field sync pulse is not so detected the Field counter is caused to reset in response to the Field counter reaching, respectively, the 388th stage or the 413th stage, the signal being provided by the logic 150 or 152.

When the wide window logic detects a field sync pulse but the 525 logic 150, or the 625 logic 152, does not detect the field sync pulse, the field sync pulse of the next field occurs at a slightly different time within the next Field counter operating cycle. Thus, it is ensured that a field sync pulse is detected within the appropriate 525 or 625 logic windows within a small number of fields.

Because of the extra line in each odd-number line field scan compared to the even-number line field scan, the field sync pulses should occur at either the 387th or the 388th; or the 412th or 413th counter stage; with the logic means operating in the required manner.

Further, if the logic 150 or 152 fails to detect a field sync pulse in an operating cycle, and the Field counter resets in response to the receipt by the logic 150 or 152 of a signal from either the 388th or the 413th counter stage, the counter stage at which the logic 150 or 152 should receive a field sync pulse drifts by one counter stage per operating cycle.

It is possible that the wide window logic, or the 525 logic, or the 625 logic, now fails to detect a field sync pulse; or the 525/625 decision logic, now fails to continue to detect a field sync pulse in the same part of the wide window, because of spurious noise being detected as comprising a field sync pulse.

However, in response to the 525 logic 150, or the 625 logic 152, detecting a field sync pulse in two successive fields, the appropriate logic, 150, or 152, is actuated, and a signal is provided, respectively, on a lead 162, or a lead 164, to a latch 166, designated the 525/625 latch. In turn, the 525/625 latch 166 provides a signal, respectively, on a lead 168, to actuate the loading means 138, to load a count of 125 into the Field counter; or on a lead 170, to actuate the loading means 128, to load a count of 100 into the Field counter. Simultaneously, the 525/625 latch 166 disenables the 525 logic 150 by a signal on a lead 172, or the 625 logic 152 by a signal on a lead 174, when the logic is not actuated, and a signal is provided by the 525/626 latch 166, on a lead 176, to disenable the window logic 100, and, hence, also, the 525/625 decision logic 120. As a result the logic means locks in its present mode of operation.

The 525 logic 150, and the 625 logic 152, are arranged so that, if after the logic means is locked in one of its two possible modes of operation, the actuated logic 150, or 152, does not detect the presence of a field sync pulse in fourteen successive fields, i.e. the field sync pulses are not detected by the 388th counter stage, or the 413th counter stage, respectively, in response to a signal on, respectively, lead 162, or 164, the 525/626 latch 166 becomes disenabled; and the wide window logic 100, and the 525/625 decision logic 120, become enabled again, and the logic means begins again the search for a field sync pulse in the wide window.

As stated above, irrespective of whether the TV receiver is arranged to operate upon the 525, or the 625 display frame line transmission system, it is inherent that the centre raster line of each raster field is coincident with the longitudinal axis of symmetry, or X axis, of the CRT screen. Further, it is required to be arranged that the raster scan pattern with the 625 display frame line transmission system is the same size as the raster scan pattern with the 525 display frame line transmission system, both raster frame scan patterns being the same size as the CRT screen. Thus, if the overall gain of the Field DAC 36 is not altered appropriately, the width of the 525 raster line frame pattern along the Y axis of the CRT screen is less than the width of the 625 raster line frame pattern. It is convenient to arrange that the length of each form of raster pattern along the X axis of the CRT screen is the same, without any alteration of the gain of the Line DAC 34, although the value of N, by which the Line counter 31 divides the oscillator pulses supplied thereto, may be arranged to be modified slightly, say, from N being 123, for the 625 raster frame line pattern, to N having a value of 121 for the 525 raster frame line pattern.

The two required overall gains required for the Field DAC 36 have the ratio 625:525 associated therewith, ignoring variations in the gain throughout each raster frame scan period in order to correct for distortion of the raster pattern otherwise obtained, and as described above.

The logic means in accordance with the present invention may have several different forms, but is required to load selectively one of two possible numbers into the Field counter, so that the TV receiver is to be capable of operating automatically to provide either of two forms of raster frame pattern. Similar automatic switching is required in relation to the receipt by the TV receiver of two forms of sound signal.

It is possible that the logic means in accordance with the present invention is capable of providing automatically more than two forms of raster frame pattern.

It is not essential, for example, that the 525 logic 150, and the 625 logic 152, is provided.

The present invention may be incorporated in other types of TV receiver than a flat screen TV receiver as described above.

The digital means may have any convenient form instead of the oscillator, driving a Line counter and a Field counter.

The Line counter, and/or the Field counter, may be replaced by equivalent means. It may be convenient to replace either counter by equivalent, composite means, whereby the parts of the differential digital signals corresponding to the MSB's of these signals are generated by counter stages, and are supplied to the decoder 48 of each DAC to be driven thereby; and the remaining parts of the differential digital signals, corresponding to the LSB's of these signals, are generated by shift register stages, and are supplied to the subdivision system 45 of each DAC to be driven thereby.

The arrangement may be such that the logic means does not operate upon digital signals of a differential form received from the Field counter.

If the outputs of the DAC's are applied to the deflection plates via integrating means, the integrating means to provide sawtooth waveforms, the analogue output of each DAC causing required compensating factors to be applied to the sawtooth waveforms, it is not essential that the DAC's operate upon differential digital input signals thereto, nor that, in response, the DAC's provide differential analogue outputs therefrom.

What we claim is:

1. A circuit for converting a TV receiver, capable of operating in accordance with, at least, two transmission systems, to operate in accordance with the appropriate system, in response to the receipt of signals of one system, the circuit having a counter driven by pulses supplied thereto at a constant pulse repetition rate, each pulse representative of one end of a raster scan line, the counter having M constituent stages, where M is greater than either constituent number of raster field line scans, F and F', with F less than F', in each of the two interlaced raster field patterns comprising each frame, of the two forms of frame to be displayed by the TV receiver, and associated with the two transmission systems, a field synchronism (sync) pulse being provided at the end of each transmitted information field, the centre raster line of each raster field pattern, of either of the two forms of raster frame pattern to be provided by the TV receiver, corresponding to the digital signal from the centre, M/2th, stage of the counter, and the circuit including logic means capable of preloading, selectively, one of two counts R and R' into the counter, before operating cycles of the counter, the arrangement being such that $(M-2R)$ is equal to F, and $(M-2R')$ is equal to F', the logic means including a first constituent part arranged to detect when a field sync pulse occurs within a first time interval of a counter operating cycle period, the first time interval comprising a minor portion of the maximum possible operating cycle period of the counter, and starting at the relative timing corresponding to the Gth counter stage, before the relative timing in the operating cycle period corresponding to the $(M-R)$th counter stage, and terminating at the relative timing corresponding to the Hth counter stage, after the relative timing corresponding to $(M-R')$th counter stage, and the logic means also including a second constituent part arranged to detect when a field sync pulse occurs in relation to the relative timing corresponding to the Kth counter stage, the relative timing corresponding to the Kth stage being between the relative timings corresponding to the $(M-R)$th and $(M-R')$th counter stages, in operation, each counter operating cycle terminating at the Hth counter stage, until the first constituent part of the logic means detects a field sync pulse within the first time interval of a counter operating cycle period, and, in response, a count of R' being preloaded into the counter before its next operating cycle, and the first constituent part of the logic means also enabling the second constituent part of the logic means, when a subsequent field sync pulse is detected by the first constituent part of the logic means to be within the first time interval of the associated counter operating cycle period, and when the second constituent part of the logic means determines that the next field sync pulse is after the relative timing corresponding to the Kth counter stage, the logic means being arranged to continue to preload a count of R' into the counter before subsequent operating cycles of the counter, and when the second constituent part of the logic means determines that the next field sync pulse is before the relative timing corresponding to the Kth counter stage, the logic means being arranged to preload a count of R into the counter before subsequent operating cycles of the counter.

2. A circuit as claimed in claim 1 in which each digital signal operated upon within the logic means of the circuit is of differential form.

3. A circuit as claimed in claim 1 in which digital means is provided, including the counter having M constituent stages, the digital means being arranged to provide digital output signals to drive digital-to-analogue converters (DAC's), in response, the DAC's being arranged to generate functions, representative of variations of corresponding analogue outputs from the DAC's, the analogue output of one DAC being applied to the X deflection plates of the cathode ray tube (CRT) of the TV receiver, to cause each raster line scan, and the analogue output of another DAC being applied to the Y deflection plates of the CRT, the counter providing digital signals to said another DAC.

4. A circuit as claimed in claim 3 in which the digital means, and the associated DAC's, are arranged to operate upon digital signals having a differential form.

5. A circuit as claimed in in claim 1 in which there is provided digital means including an oscillator having an output with a constant pulse repetition rate associated therewith, and arranged to be supplied to a Line counter, the Line counter being arranged to be reset after each raster line scan period (t), and, in response to resetting, supplying a pulse to the counter having M constituent stages, arranged to be reset after each raster frame scan period (T).

6. A circuit as claimed in claim 5 in which the digital means in arranged to operate upon digital signals having a differential form.

7. A circuit is claimed in claim 1 arranged such that the counter having M constituent stages resets upon receipt by the TV receiver of a field sync pulse.

8. A circuit as claimed in claim 1 in which there is a provided a shift register equivalent to part of said counter having M constituent stages.

9. A circuit as claimed in claim 1 arranged such that $M<2F$.

10. A circuit as claimed in claim 1 arranged such that $2G>M$.

11. A circuit as claimed in claim 1 arranged such that M is 512, F is 262/263, F' is 312/313, R is 100, and R' is 125.

12. A circuit as claimed in claim 1 arranged such that the wide window corresponds to 106 stages of the counter.

* * * * *